United States Patent [19]
Lee et al.

[11] Patent Number: 5,402,049
[45] Date of Patent: Mar. 28, 1995

[54] SYSTEM AND METHOD FOR CONTROLLING A VARIABLE RELUCTANCE SPHERICAL MOTOR

[75] Inventors: Kok-Meng Lee; Robert S. Blenis, both of Marietta; Tsang-Long Pao, Lilburn, all of Ga.

[73] Assignee: Georgia Tech Research Corporation, Atlanta, Ga.

[21] Appl. No.: 993,299

[22] Filed: Dec. 18, 1992

[51] Int. Cl.⁶ .............................................. H02P 5/34
[52] U.S. Cl. ........................... 318/568.1; 318/568.21; 318/568.11; 901/28; 901/29
[58] Field of Search ............................... 318/560–646, 318/135–139; 395/80–99, 275, 220; 901/1, 3, 7, 9, 13, 20–23, 40–57, 28, 29; 310/90.5, 166, 316–328

[56] References Cited

U.S. PATENT DOCUMENTS

| | | | |
|---|---|---|---|
| 3,596,523 | 8/1973 | Clark | 74/5.6 |
| 3,780,444 | 12/1973 | Taylor | 33/327 |
| 3,854,341 | 12/1974 | Quermann | 74/5.7 |
| 3,877,850 | 4/1975 | Berry | 418/68 |
| 3,899,728 | 8/1975 | Hoppe | 318/687 |
| 4,524,386 | 6/1985 | Scott | 358/113 |
| 4,533,827 | 8/1985 | Fincher | 250/211 K |
| 4,628,765 | 12/1986 | Dien et al. | 901/18 X |
| 4,634,889 | 1/1987 | Foggia et al. | 318/649 |
| 4,707,642 | 11/1987 | Sorimachi et al. | 318/37 |
| 4,707,647 | 11/1987 | Coldren et al. | 318/568 |
| 4,727,278 | 2/1988 | Staufenberg, Jr. et al. | 310/328 |
| 4,739,241 | 4/1988 | Vachtsevanos et al. | 318/801 |
| 4,807,153 | 2/1989 | Onaga et al. | 318/563 X |
| 4,853,630 | 8/1989 | Houston | 901/15 |
| 4,864,206 | 9/1989 | Onaga et al. | 318/568.11 |
| 4,874,998 | 10/1989 | Hollis, Jr. | 318/568.21 |
| 4,962,425 | 10/1990 | Rea | 358/139 |

(List continued on next page.)

FOREIGN PATENT DOCUMENTS

1516344A  10/1989  U.S.S.R. .

OTHER PUBLICATIONS

G. J. Vachtsevanos et al., "Development of a Novel Intelligent Robotic Manipulator," *IEEE Control Systems Magazine*, Jun. 1987, vol. 7, No. 3.

(List continued on next page.)

*Primary Examiner*—Paul Ip
*Attorney, Agent, or Firm*—Hopkins & Thomas

[57] ABSTRACT

A spherical motor (10) provides smooth isotropic motion. The spherical motor (10) has a spherical stator (12) surrounding a spherical rotor (18). A motor shaft (24) is mounted to the rotor (18), or alternatively, to the stator (12) for performing work in isotropic motion. A grid pattern is situated to move substantially concentrically with the rotor (18) and in conjunction with the motor shaft (24). A vision system (80) monitors the grid pattern (42) and determines in real time the position of the motor shaft (24). The vision system (80) has at least one image sensor (44) positioned on the stator (12) and a computer system (82) for processing data independent of a remote host computer (122). Further, a motor controller (191) using a motor control algorithm (200) may be interfaced with the vision system (80) to thereby derive a motor control system (190) for controlling the spherical motor (10) based upon the rotor orientation information retrieved by the vision system (80). Finally, a video controller (106) can be interfaced with the vision system (80) for converting digital image data in real time to analog image data conforming to the RS-170 television standard for viewing on a display device (116).

24 Claims, 13 Drawing Sheets

U.S. PATENT DOCUMENTS

| | | | |
|---|---|---|---|
| 4,963,036 | 10/1990 | Drisko et al. | 382/50 |
| 4,983,875 | 1/1991 | Masaki et al. | 310/323 |
| 4,998,284 | 3/1991 | Bacus et al. | 382/6 |
| 5,010,773 | 4/1991 | Lorenz et al. | 310/319 X |
| 5,023,533 | 6/1991 | Ishikawa et al. | 318/568.21 |
| 5,027,115 | 6/1991 | Sato et al. | 341/13 |
| 5,033,096 | 7/1991 | Morrison et al. | 382/8 |
| 5,038,065 | 8/1991 | Matsubayashi et al. | 310/62 |
| 5,043,621 | 8/1991 | Culp | 310/316 |
| 5,046,190 | 9/1991 | Daniel et al. | 382/49 |
| 5,113,117 | 5/1992 | Brooks et al. | 310/328 |
| 5,125,595 | 6/1992 | Helton | 244/3.16 |
| 5,146,340 | 9/1992 | Dickerson et al. | 358/213 |
| 5,146,566 | 9/1992 | Hollis, Jr. et al. | 395/275 |
| 5,165,841 | 11/1992 | Asano et al. | 901/9 |
| 5,168,221 | 12/1992 | Houston | 324/207.13 |
| 5,177,563 | 1/1993 | Everett et al. | 901/47 |
| 5,180,955 | 1/1993 | Karidis et al. | 318/568.1 |
| 5,185,667 | 2/1993 | Zimmermann | 358/209 |
| 5,199,864 | 4/1993 | Stecklein | 418/68 |
| 5,204,573 | 4/1993 | Bederson et al. | 310/198 |
| 5,223,709 | 6/1993 | Pettypiece, Jr. | 250/229 |
| 5,280,225 | 1/1994 | Pine et al. | 318/575 |

OTHER PUBLICATIONS

K. Davey et al., "The Analysis of Fields and Torques in Spherical Induction Motors," *IEEE Transactions of Magnetics,* vol. mag-23, No. 1, Jan. 1987, pp. 273-281.

R. L. Hollis et al., "A Six Degree-of-Freedom Magnetically Levitated Variable Compliance Fine Motion Wrist," Proceedings of the Fourth International Symposium on Robotics Research, Santa Cruz, Aug., 1987, pp. 65-73.

K. Kaneko et al., "A Spherical DC Servo Motor with Three Degrees of Freedom," ASME Trans. on Dynamic Systems, Measurement & Control, vol. III, Sep. 1989, pp. 398-408.

A. Foggia et al., "A New Three Degrees of Freedom Electromagentic Actuator," Conference Record-IAS Annual Mtg. vol. 35, No. 6, pp. 137-141.

K-M. Lee, "Development of a Variable-Reluctance Spherical Motor," Reprint of Proceeding of the 18th NSF Grantees Conference on Design and Manufacturing Systems Research, Atlanta, Ga., Jan. 8-12, 1992.

Lee, K-M., "Design Concept and Prototype Development of a Flexible Integrated Vision System," presented at SME Applied Vision Conference, Jun. 1-4, 1992, Atlanta, Ga.

Lee, K-M., "A Machine-Vision-Based Wrist Sensor for Direct Measurement of Three Degrees-of-Freedom Orientation", presented at SME Applied Vision Conference, Jun. 1-4, 1992, Atlanta, Ga.

SYSTEM AND METHOD FOR CONTROLLING A VARIABLE RELUCTANCE SPHERICAL MOTOR

The U.S. government has a paid-up license in this invention and the right in limited circumstances to require the patent owner to license others on reasonable terms as provided by the terms of Contract Number E25-644 awarded by the National Science Foundation.

Reference is made to the following commonly-assigned related applications: pending application Ser. No. 07/992,595; Ser. No. 07/993,318 issued as U.S. Pat. No. 5,319,577; and pending application Ser. No. 07/120,168.

FIELD OF THE INVENTION

The present invention generally relates to a real-time vision system and an optimized control algorithm for a spherical motor.

PRIOR ART

An increasing need for high performance robotic applications has motivated researchers to investigate new actuator concepts for improving the dexterity of robotic wrists. Examination of existing mechanical joints reveals that the ball-joint-like spherical actuator is an attractive alternative to the three consecutive rotational joint configuration. The interest in spherical motors in a robotic wrist is triggered because of its simple design, its ability in providing the roll, yaw, and pitch motion in a single joint, and its isotropic kinematics and kinetics. Also, it has no singularity in the middle of work space except the boundary. In other words, it provides for movement in any direction at any given instant in time. Further, the elimination of gears and linkages enables both high precision positioning and fast dynamic response. The foregoing attractive features make spherical motors attractive for use with, for example, high speed plasma and laser cutting where the cutter orientation must be achieved rapidly and continuously in all directions. Other applications include coordinate measuring machines and tally operated joysticks, where continuous isotropic motion in all directions is necessary.

Recently, several design concepts for spherical motors were proposed by researchers in the art. A spherical induction motor for robotic applications was described in the following related publications: G. J. Vachtsevanos et al., "Development of a Novel Intelligent Robotic Manipulator," *IEEE Control Systems Magazine*, June 1987, K. Devey and G. J. Vachtsevanos, "The Analysis of Fields and Torques in a Spherical Induction Motor," *IEEE Trans. Magnetics*, vol. mag-23, March 1987, and U.S. Pat. No. 4,739,241 to G. J. Vachtsevanos et al. However, it is difficult to realize a prototype of this kind because of its complexity in mechanical and winding design and manufacturing, which requires inlaying all three transversing windings on the inner spherical surface of the stator. Laminations are required to prevent movement of unwanted eddy currents. Complicated three phase windings must be mounted in recessed grooves in addition to the rolling supports for the rotor in a static configuration. These and other configurations have led other researchers to investigate an alternative spherical motor based upon the concept of variable reluctance stepper motors, which are easier to manufacture.

In R. L. Hollis et al., "A Six Degrees of Freedom Magnetically Livitated Variable Compliance Fine Motion Wrist," *Proceedings of the Fourth International Symposium on Robotics Research*, Santa Cruz, August, 1987, a direct current (DC) "magic wrist" having six degrees-of-freedom (DOF) in rotation was disclosed as part of a robotic manipulator. A DC spherical motor with three DOF was described in K. Kaneko et al., "A Spherical DC Servo Motor With Three Degrees of Freedom," *ASME Trans. On Dynamic Systems, Measurement and Control*, vol. III, November 3, September, 1989, pp. 398-402, which can spin continuously and has a maximum inclination of 15°. Although the control of a DC spherical motor is relatively simple, the range of inclination and the torque constant are rather limited. Furthermore, an induction type spherical motor of different structure, which has a range of motion characterized by a cone of 60°, was disclosed in A Foggia et al "New Three Degree of Freedom Electromagnetic Actuator," *Conference Record—IAS Annual Meeting*, vol. 35, no. 6, published by IEEE, New York, N.Y., USA, 1988, pp. 137-141.

As compared with its DC counterpart, a VR spherical motor has a relatively large range of motion, possesses isotropic properties in motion, and is relatively simple and compact in design. However, a VR spherical motor requires a very sophisticated control scheme. A dynamic model and control strategy for a VR spherical motor is discussed in K. -M. Lee, "Development of a Variable Reluctance Spherical Motor," Reprint of Proceeding of the 18th NSF Grantees Conference on Design and Manufacturing Systems Research, Atlanta, Ga., Jan. 8-12, 1992, the disclosure of which is incorporated herein by reference.

Furthermore, in order to control a VR spherical motor, a very sophisticated position encoding system is needed for monitoring the rotor orientation. If single axis encoders are employed for measuring three DOF orientation of the ball-joint-like rotor, then a moving mechanism is generally required in order to constrain rotor motion to an extent so that roll, yaw, and pitch motion can be measured individually via single axis shaft encoders. An example of a moving mechanism for a ball-joint-like joystick device which could be employed in a spherical motor is disclosed in Soviet Union Patent 1516344A. However, such a moving mechanism undesirably introduces friction, stiction, and inertia making the monitoring system impractical for many applications.

Hence, because of the requisite complex control and position encoding schemes, researchers have been unable to develop and implement a workable and practical VR spherical motor which can be used for the many desired applications described above.

SUMMARY OF THE INVENTION

Accordingly, an object of the present invention is to overcome the problems and deficiencies associated with the prior art.

Another object of the present invention is to provide a workable and practical VR spherical motor and associated methodology.

Another object of the present invention is to provide a spherical motor which is simple in structure, inexpensive to manufacture, and reliable in operation.

Another object of the present invention is to provide a spherical motor and method for allowing smooth isotropic orientation actuation and high positioning resolution.

Another object of the present invention is to provide a spherical motor and method for providing a large torque-to-weight ratio.

Another object of the present invention is to provide an orientation sensing system and method for measuring three DOF orientation of any spherical body, for example, a ball-joint-like device in a spherical motor, a robotic wrist, or a joystick.

Another object of the present invention is to provide an orientation sensing system and method for a spherical body for providing essentially non-contact measuring of position, thereby eliminating friction and stiction, minimizing the inertia of the measuring mechanism, and allowing for smooth isotropic joint motion.

Another object of the present invention is to provide an orientation sensing system for a spherical body which exhibits relatively simple kinematics and compact design.

Briefly stated, the present invention provides a spherical motor for providing smooth isotropic motion, an orientation sensing system for permitting non-contact orientation measurement of a spherical body, for example, the spherical rotor of the novel spherical motor, a vision system for permitting real time processing of an image, for instance, an image from an image sensor of the novel orientation sensing system, and a motor control system for interfacing with the vision system and controlling the spherical motor with the aid of a motor control algorithm.

The spherical motor has a spherical stator with a plurality of stator pulls. A spherical rotor is surrounded by the stator and has a plurality of rotor pulls. A shaft mounted to the rotor protrudes through a stator opening for permitting isotropic movement of the shaft. A grid pattern is situated substantially concentric with the rotor and is movable in conjunction therewith. In a preferred embodiment, the grid pattern is situated on the outside of the rotor itself. An image sensor is disposed on the stator for viewing the grid pattern. A processor associated with the image sensor determines the position of the shaft via the image of the grid pattern sensed by the image sensor.

The orientation sensing system, which has been implemented in association with the spherical motor, permits non-contact position measurement of any spherical body, including but not limited to, the rotor of the novel spherical motor. Broadly conceptualized, the orientation sensing system includes the following elements. It includes a grid pattern situated substantially concentric with the spherical body and movable in conjunction therewith. An image sensor is disposed to view the grid pattern. Finally, a processor is associated with the image sensor for determining the position of the spherical body based upon an image of a portion of the grid pattern which is retrieved by the image sensor.

The vision system, which has been implemented in association with the spherical motor, permits real time processing of images, including but not limited to, those images retrieved by the orientation sensing system of the novel spherical motor. The vision system is described as follows. A computer system has a digital signal processor for processing digital image data, a communications port (serial or parallel) for communicating with a host computer, a ROM for receiving a program for operating the computer system from the host computer, and a RAM for receiving and running the program. An imaging system is in communication with the computer system. The imaging system has an image sensor for receiving an image from an illuminated object, for example but not limited to, the novel grid pattern on a spherical motor rotor, an analog-to-digital converter for converting the image to digital image data, and a video buffer for storing the digital image data. Finally and significantly, the vision system has a means for selectively causing the imaging system to discard pixel areas of the image which are outside of a pertinent pixel area containing the object, the pixel area being defined by selectable rows and selectable columns, and for directly transferring the pertinent pixel area to the digital signal processor. In addition, the vision system may also have a means for converting the area to an RS-170 standard signal for calibrating, storing, or direct viewing on any display device.

The motor control system interfaces with the vision system and controls the spherical motor with the aid of a motor control algorithm. The motor control system comprises a processor interfaced with the processor of the vision system and disposed for performing the motor control algorithm, a decoder communicating with the processor, and a DAC means for converting digital signals from the decoder into analog signals for each of the plurality of stator poles.

The motor control algorithm optimally controls the spherical motor by determining stator current values $U_i$ for $i=1, \ldots, n$ for n stator poles in order to achieve desired torques. The algorithm involves minimizing total energy input to the stator poles when determining the stator current values. Moreover, each stator current value $U_i$ is compared to a maximum current value $U_{max}$ and is replaced with the maximum current value if the stator current value exceeds the maximum current value, or when $U_i > U_{max}$. Finally, the stator current values are forwarded to the n stator poles for ultimate control of the rotor.

Other objects, features, and advantages of the present invention will become apparent to one of skill in the art upon review of the following drawings and the detailed description of the preferred embodiments.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENTS

1. Spherical Motor

Figure 1A:
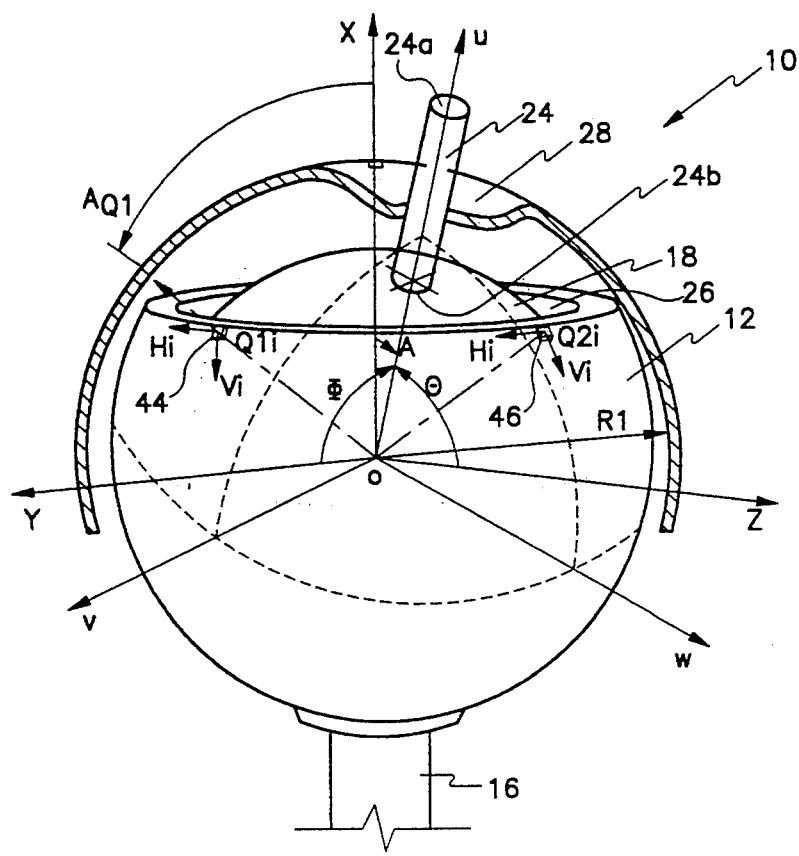
FIG. 1A is a cut-away perspective view of a spherical motor in accordance with the present invention.

With reference now to the figures wherein like reference numerals designate corresponding parts throughout the several views, FIG. 1A shows a ball-joint-like variable reluctance (VR) spherical motor 10 which permits isotropic motion, including roll, yaw, and pitch, in a single joint. The spherical motor 10 has potential applications in almost any ball-joint-like device where continuous isotropic motion in all directions is required. It can be used as a provider of force for performing work, for example, as a robotic wrist actuator. It also has potential applications as a receiver of force for monitoring motion, for example, as a coordinate measuring machine or as a joystick.

The spherical motor 10 comprises a spherical stator 12 having a plurality of internal bearing mechanisms (as examples, ball bearing type, FIG. 1B; or fluid type, FIG. 1C-1E) and a plurality of poles 14 (FIG. 1B), each having preferably a controllable electric coil which can be individually energized and an associated core of a suitable material, for example, a ferromagnetic (iron) material. The spherical stator 12 is supported by a support mechanism 16. A spherical rotor 18 is freely movable within the stator 12 as a result of the bearing mechanisms. The spherical rotor 18 has a plurality of rotor poles 22 (FIG.-1B), each preferably a ferromagnetic (iron) material core, a magnetic core, an electromagnet, or other suitable magnetic field generator. The spherical rotor 18 is concentric with the stator 12 and has an infinite number of rotational axes about its center with three degrees of freedom. A motor shaft 24 mounted to the rotor 18 at its base end 24a protrudes outwardly through a circular stator opening 26, which permits isotropic movement of a distal end 24b of the motor shaft 24. A hemispherical cover shell 28 has a central aperture 32 for receiving the motor shaft 24 therethrough. Essentially, the hemispherical cover shell 28 encloses the internal rotor 18 for added durability and may be provided with a grid pattern of an orientation sensing system, as will be described in detail relative to FIG. 2A.

Worth noting is that the spherical motor 10 of FIG. 1A may be configured so that the internal rotor 18 remains fixed while the surrounding stator 12 rotates isotopically about the rotor 18. In this case, the shaft 24 is mounted to the stator 12 for performing isotropic rotational work.

Figure 1B:
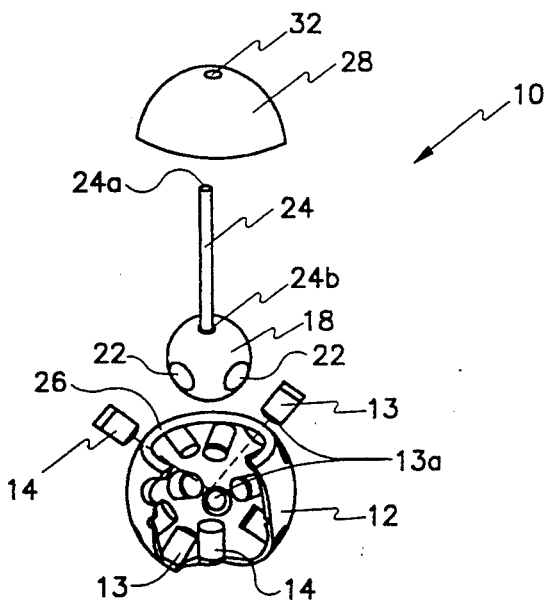
FIG. 1B is an assembly view of the spherical motor of FIG. 1A having a plurality of ball bearing mechanisms for supporting a spherical rotor within a spherical stator.

The bearing mechanisms are preferably realized in either a ball bearing configuration or a fluid configuration, as will now be described relative to FIGS. 1B and 1C–1E, respectively. However, obviously, other configurations are possible. FIG. 1B shows the spherical motor 10 having a plurality of ball bearing mechanisms 13 mounted in the stator 12 for supporting and permitting rotation of the rotor 18 therein.

Although not necessary, it is advisable to space the ball bearing mechanisms 13, the stator poles 14, and the rotor poles 22 at the vertices of regular polyhedron configurations modelled about the spherical motor 10 for achieving optimum torque and optimum forced rotational motion. Placement of rotor and stator poles of a spherical motor in polyhedron configurations is described in K. -M. Lee, "Development of a Variable Reluctance Spherical Motor," Reprint of Proceeding of the 18th NSF Grantees Conference on Design and Manufacturing Systems Research, Atlanta, Ga., Jan. 8–12, 1992. However, other spacing configurations are possible. In addition, the rotor 18 should be provided with less poles than the stator 12 so as to avoid electromechanical singularity, which would result in the loss of one or more degrees of freedom (DOF). Furthermore, for proper rotor stability, at least four ball bearing mechanisms 13 should be employed. The four bearing mechanisms are located on the stator 12 such that one of the bearing mechanisms 13 is mounted perpendicular to a plane formed by the other three bearing mechanisms 13. For practical reasons, however, a greater number than four is preferred because in this case the load is shared among the various ball bearing mechanisms 13, thus enabling the use of smaller, inexpensive ball bearing mechanisms and thus enhancing ball bearing longevity.

Figure 1E:
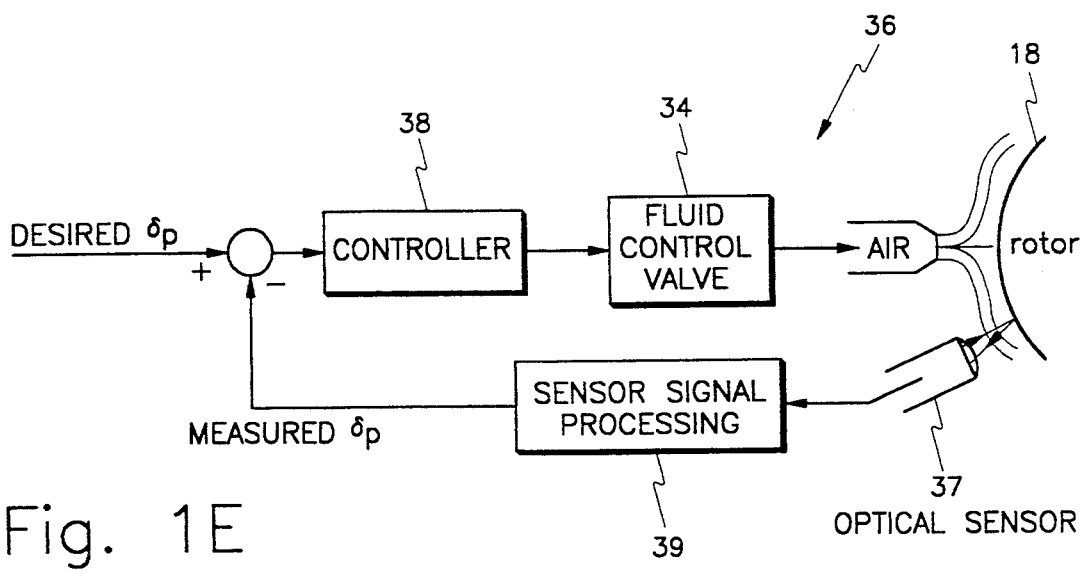
FIG. 1E is a block diagram of a closed loop control system for the fluid bearing mechanisms of FIG. 1C.
Figure 1D:
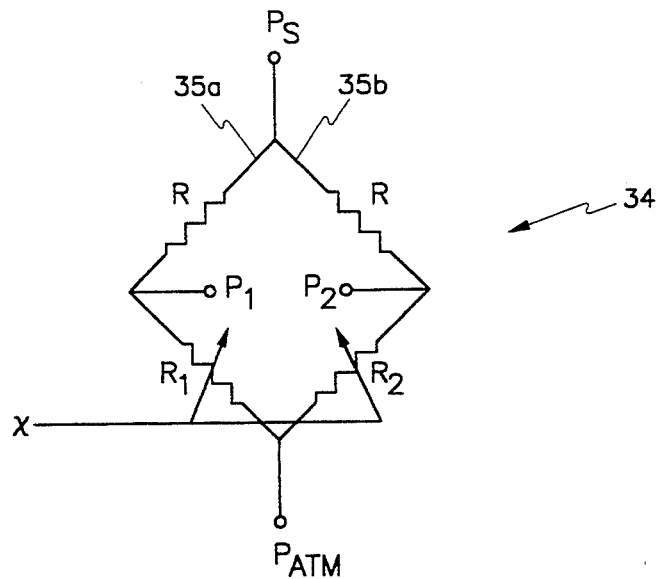
FIG. 1D is a schematic view of a fluid control valve for the fluid bearing mechanisms of FIG. 1C.
Figure 1C:
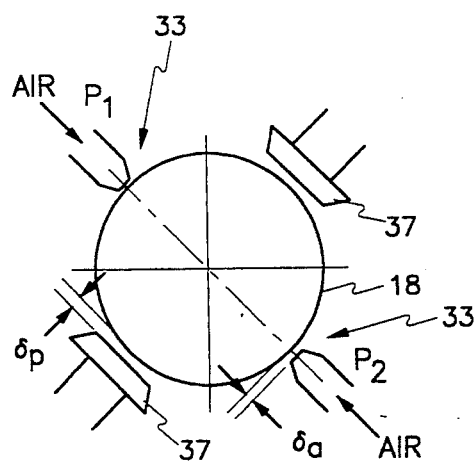
FIG. 1C is a schematic view of the spherical motor of FIG. 1A having a plurality of fluid bearing mechanisms for supporting a spherical rotor within a spherical stator with a fluid, for example, air.

FIG. 1C shows the spherical motor 10 having a plurality of fluid bearing mechanisms 33 mounted in the stator 12 for supporting and permitting rotation of the rotor 18 therein. At least three pairs (the mechanisms 33 of each pair being mounted diametrically opposed as shown in FIG. 1C) of orthogonal fluid bearing mechanisms 33 are needed in order to provide at least three pairs of opposing normal forces acting radially towards the center of the rotor 18. Preferably, five pairs of fluid bearing mechanisms 33 are utilized to support the rotor 18. The five pairs are evenly spaced on two circular rings which are parallel and symmetrical about the YZ plane of FIG. 1A. Only a pair of fluid bearing mechanisms 33 are illustrated in FIG. 1C for simplicity.

Each fluid bearing mechanism 33 discharges a jet of fluid, such as a liquid or gas, at respective pressures P₁ and P₂. Preferably, the fluid is air and is projected via pneumatic means. The pair of radial forces acts diametrically through the center of the rotor 18 so that one of the radial forces acts on one rotor hemisphere and the other acts on the other rotor hemisphere. The fluid or air impinging upon the rotor 18 within the stator 12 is discharged through the stator opening 26.

The pressures P₁ and P₂ can be controlled by a fluid flow control valve 34, shown schematically in FIG. 1D. Fluid at constant pressure $P_s$, is caused to flow through two paths 35a, 35b, each comprising a constant restriction R in series with a variable restriction $R_1$, $R_2$, respectively. The two constant restrictions R, R of the two paths 35a, 35b have equal resistance to the fluid flow at pressure $P_s$. By varying the cross-sectional areas of the variable restrictions $R_1$, $R_2$, the pressures P1, P2 can be controlled by an external electromechanical input x.

Each of the fluid bearing mechanisms 33 has an associated closed loop control system 36, as shown in FIG. 1E, for control and monitoring the fluid flow against the rotor 18. The closed loop control system 36 achieves a constant spacing between the stator 12 and the rotor 18 by means of a high resolution optical sensor 37, preferably a Hewlett Packard HPHBCS-1100 sensor. The external electromechanical input x of FIG. 1D is controlled by a controller 38, for example, a torque motor in combination with a digital proportional-integral-derivative (PID) controller or some other suitable controller device. The controller 38 generates the input x based on the difference between a desired reference input $\delta_p$ and the actual spacing $\delta_p$ from the feedback optical sensor 37 having associated sensor signal processor 39. The sensor signal processing 39 is, for example, an analog amplification circuit with an analog-to-digital converter (ADC).

Furthermore, in addition to fluid suspension of the rotor 18 within the stator 12, it is envisioned that the rotor 18 may be suspended within the stator 12 via other mechanisms, such as electrostatic means.

2. Orientation Sensing System

Figure 2A:
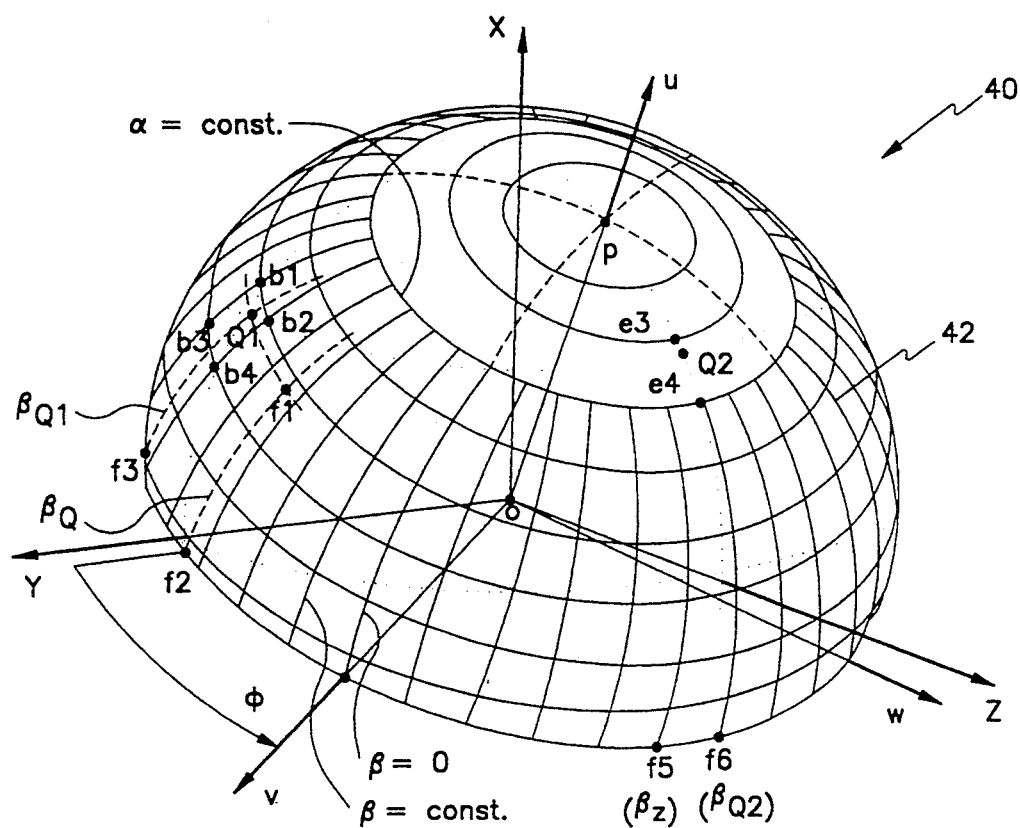
FIG. 2A is a graphical diagram of a spherical grid pattern for an orientation sensing system in accordance with the present invention.

An orientation sensing system 40 for permitting non-contact position and direction measurement of any spherical body, for example, the spherical rotor 18 of the spherical motor 10, is graphically illustrated in FIG. 2A. The orientation sensing system 40 provides for direction measurement of the combined roll, yaw, and pitch motion, eliminates friction and stiction, and exhibits a relatively low inertia.

In structure, the orientation sensing system 40 comprises a spherical grid pattern 42 situated on the exterior of the rotor 18 or on the interior of the hemispherical cover shell 28 and at least one image sensor $Q_{1i}$ and preferably two image sensors $Q_{1i}$, $Q_{2i}$ spaced 90 degrees apart, as designated by respective reference numerals 44, 46 in FIG. 1A. The grid pattern 42 is made up of symmetrically spaced radial lines continuously converging at a point P, where the motor shaft 24 is situated, and a set of parallel lines which are orthogonal to the radial lines and which surround the point P. Essentially, the grid pattern 42 is similar to the longitude/latitude grid lines on an earth globe.

The orientation sensing system 40 of FIG. 2A is able to determine a body coordinate frame of the rotor 18 with respect to the surrounding stator 12. Use of the grid pattern 42 for determining the position of the motor shaft 24 is now described hereafter relative to FIGS. 2B through 2F. Worth noting is that the coordinate frames utilized in the following description are shown in FIGS. 1A and 2A. In this regard, a reference coordinate frame XYZ is situated at the center of the stator 12 with its X-axis pointing toward the opening of the spherical stator 12. A body coordinate frame uvw of the rotor 18 is defined at the center of the rotor 18 with its u-axis pointing along the motor shaft 24. The rotor coordinate frame uvw with respect to the stator coordinate frame XYZ is determined by computing the position of the motor shaft 24 and the spin about the motor shaft 24. In the following discussions, the following notations are used: $A_{(.)}$ denotes the angle measured from the X-axis to a position vector of a point (.) from the origin O. Similarly, $\alpha_{(.)}$ denotes the angle measured from the positive u-axis to a position vector of the point (.). $\beta_{(.)}$ defines the angle measured from the positive v-axis to the projection of a position vector of the point (.) on the vw-plane. Both $\alpha_{(.)}$ and $\beta_{(.)}$ are defined in the coordinate frame uvw.

2.1 Determination Of Motor Shaft Position

The position of the motor shaft 24 (or the u-axis) with respect to the XYZ frame of reference can be described by two of the three parameters; namely, $\Theta$, $\Phi$, and A as defined in FIGS. 1A and 2A. These three angles are constrained by the following orthogonal relationship:

$$\cos^2 A + \cos^2 \Phi + \cos^2 \Theta = 1 \quad (1)$$

Two other independent geometrical equations are necessary in order to determine the three angles, $\Theta$, $\Phi$, and A.

The position vector OP which characterizes the motor shaft is given by $$OP = [R_1 \cos A \; R_1 \cos \Phi \; R_1 \cos \Theta]^T \quad (2)$$

Consider any point $e_i$ which lies on the intersection between the spherical surface of radius $R_1$ and the XY plane. The following relationship can be obtained from the vector dot product between $Oe_i$ and OP:

$$\cos \alpha_{ei} = \cos A_{ei} \cos A + \sin A_{ei} \cos \Phi \quad (3a)$$

where $$OE_i = [R_1 \cos A_{ei} \; R_1 \sin A_{ei} \; 0]^T. \quad (3b)$$

Similarly, if ej is a point on the intersecting line between the spherical surface of radius $R_1$ and the XZ plane. The dot product between a position vector $Oe_j$ and OP:

$$\cos \alpha_{ej} = \cos A_{ej} \cos A + \sin A_{ej} \cos \Theta. \quad (4a)$$

where $$Oe_j = [R_1 \cos A_{ej} \; 0 \; R_1 \sin A_{ej}]^T \quad (4b)$$

Thus, if two or more points of the spherical grid surface can be measured such that their position vectors are known with respect to u- and X-axes, the angles $\Theta$, $\Phi$, and A can be determined from Equations (1) and (3) or (1) and (4).

2.2 Determination of Spin Angle

For a given shaft location, the spin is defined by the angle $\Phi$ measured from the right-half of the XY-plane to the v-axis on the vw-plane. As shown in FIG. 2A, the XY-plane intersects the vw-plane along the line $Of_2$ and thus, $\Phi$ is essentially the angle between the position vector $Of_2$ and the v-axis. Since the position vector $Of_2$ is perpendicular to OP, we have from their dot product, $$\tan A_{f2} = \frac{\cos A}{\cos \Phi} \tag{5}$$

Consider $Q_1$ to be a known point fixed on the XY plane such that $$OQ_1|_{XYZ} = [R_1 \cos A_{Q1}\ R_1 \sin A_{Q1}\ 0]^T. \tag{6}$$

The position vector $OO_1$ can also be described with respect to the uvw frame as $$OO_1|_{UVW} = [R_1 \cos \alpha_{Q1}\ R_1 \sin \alpha_{Q1} \cos \beta_{Q1}\ R_1 \sin \alpha_{Q1} \sin \beta_{Q1}]^T \tag{7}$$

If the great circle passing through $Q_1$ and P intersects the vw-plane at $f_3$ as shown in FIG. 2A, the spin angle can be determined by $$\phi = \beta_{Q1} \pm |\Delta\phi| \tag{8}$$

where $\Delta\phi$ is the angle between the two position vectors, $Of_2$ and $Of_3$.

Let $f_1$ be an intersecting point between a great circle of radius $R_1$ passing through $f_2$ and P, and a circle described by the position vector $OO_1$ as shown in FIG. 2A. The angle $\Delta\theta$ can be determined from the dot product of the two vectors $OW_1$ and $Of_1$ with respect to the uvw frame.

$$\cos \Delta\theta = \cos^2 \alpha_{Q1} + \sin^2 \alpha_{Q1} \cos \Delta\phi \tag{9}$$

or with respect to the XYZ frame, $$\cos \Delta\theta = \cos A_{Q1}(\cos \alpha_{Q1} \cos A + \sin \alpha_{Q1} \cos A_{f2}) + \sin A_{Q1}(\cos \alpha_{Q1} \cos \Phi + \sin \alpha_{Q1} \sin A_{f2}). \tag{10}$$

By equating Equations (9) and (10), $\Delta\phi$ can be found from Equation (11):

$$\cos\Delta\phi = \frac{1}{\sin^2 \alpha_{Q1}} \{\cos A_{Q1}(\cos \alpha_{Q1} \cos A + \sin \alpha_{Q1} \cos A_{f2}) + \sin A_{Q1}(\cos \alpha_{Q1} \cos \Phi + \sin \alpha_{Q1} \sin A_{f2}) - \cos^2 \alpha_{Q1}\} \tag{11}$$

Thus, Equations (8) and (11) provide a means to determine the spin $\phi$ in terms of A, $\Phi$, $\alpha_Q$, and $\beta_Q$, where $A_{f2}$ is given by Equation (5).

3. Sensor Kinematics

In general, three independent parameters are necessary to uniquely define the orientation of rotor 18. As it has been shown in the previous subsections, the computation of the shaft location requires two position vectors to be known with respect to the X- and u-axes, $A_{ei}$ and $\alpha_{ei}$ where i=1, 2. Once the motor shaft 24 is located, the spin about the u-axis can be characterized by an additional parameter $\beta_{Q1}$ as shown in Equation (8).

Consider the spherical grid pattern 42 with a radius $R_1$. The spherical grid pattern 42 is concentric with the spherical rotor 18 and is preferably rigidly mounted on the motor shaft 24 (FIG. 1A). The grid pattern 42 comprises two sets of orthogonal lines which are denoted by constant $\alpha$- and $\beta$-lines centered at the point P as shown in FIG. 2A. A constant $\alpha$-line is essentially a circle centered at the u-axis such that the angle between a position vector of any point on the constant $\alpha$-line and the u-axis is equal to $\alpha$. The constant $\beta$-lines are a family of great circles with a common diameter which lies on the u-axis. The angle measured from the v-axis to a constant $\beta$-line on the vw-plane is equal to $\beta$. An array imaging sensor $Q_{1i}$ is positioned so that a portion of the grid pattern at any instant can be registered. The optical axis of the imaging sensor 44 intersects the center of the spherical stator 12, and the spherical grid pattern 42 at $Q_1$. FIG. 2A shows the neighborhood of the optical center $Q_1$ in the object space. The coordinates of the grid points around $Q_1$ can be measured with respect to the local coordinate frame HV attached at the optical center $Q_1$.

In the following discussion, the notation $\xi_{(.)}$ is used to denote the angle between the position vectors of the point (.) and $Q_1$:

$$\xi_{(.)} = \sin^{-1}\left(\frac{r_{obj}(.)}{R_1}\right) \tag{12}$$

where $r_{obj}(.)$ defines the distance between the point (.) and the optical axis $OQ_1$.

3.1 Single Image Sensor

The determination of the motor shaft position requires two known position vectors with respect to X- and u-axes. Since the optical center $Q_1$ is known and is fixed on the XY-plane, the two intersecting points between the H-axes and the two adjacent $\alpha$-lines can be characterized with respect to the X-axis:

$$A_{ei} = A_{Q1} - \xi_{ei}\ i = 1\text{ and } 2. \tag{13}$$

By using Equation (4), the angles which characterize the motor shaft position can be determined from Equation (14):

$$A = \cos^{-1}\left[\frac{\cos\alpha_{e1}\sin A_{e2} - \cos\alpha_{e2}\sin A_{e1}}{\sin(\xi_{e2} + \xi_{e1})}\right] \tag{14a}$$

and $$\Phi = \cos^{-1}\left[\frac{\cos\alpha_{e2}\cos A_{e1} - \cos\alpha_{e1}\cos A_{e2}}{\sin(\xi_{e2} + \xi_{e1})}\right] \tag{14b}$$

Since the inclination of the motor shaft 24 is constrained by the spherical stator to $\pm 90°$, A is less than 90°.

Figure 2B:
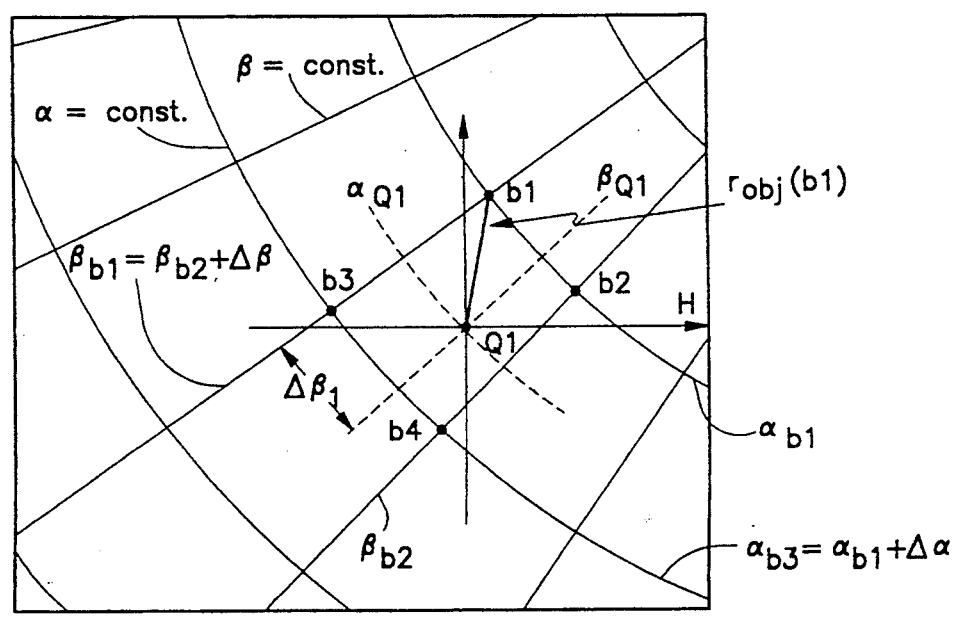
FIG. 2B is an enlarged graphical view of a grid pattern image from an image sensor disposed to view the grid pattern of FIG. 2A.

The coordinates of $Q_1$ ($\alpha_{Q1}$, $\beta_{Q1}$) must be computed in order to determine the spin. By replacing the subscript "ei" to "Q1" in Equation (3) and substituting $\cos A$ and $\cos \Phi$ from Equation (14) into the resulting equation, $\alpha_{Q1}$ can be determined from Equation (15):

$$\alpha_{Q1} = \cos^{-1}\left[\frac{\cos\alpha_{e1}\sin\xi_{e2} + \cos\alpha_{e2}\sin\xi_{e1}}{\sin(\xi_{e1} + \xi_{e2})}\right] \tag{15}$$

where $\Delta\alpha$ is the angle between two adjacent $\alpha$-lines. Alternatively $\alpha_{Q1}$ can be determined by using the intersecting points between the adjacent $\alpha$- and $\beta$-lines around $Q_1$, which are denoted by $b_i$ (i=1, 2, 3, 4) as shown in FIG. 2b. By noting that $$\cos\xi_{b1} = \cos\alpha_{b1}\cos\alpha_{Q1} + \sin\alpha_{b1}(\sin\alpha_{Q1}\cos\Delta\beta_1) \quad (16a)$$

and $$\cos\xi_{b3} = \cos\alpha_{b3}\cos\alpha_{Q1} + \sin\alpha_{b3}(\sin\alpha_{Q1}\cos\Delta\beta_1) \quad (16b)$$

we have $$\alpha_{Q1} = \cos^{-1}\left[\frac{\cos\alpha_{b1}\sin\alpha_{b3} - \cos\xi_{b3}\sin\alpha_{b1}}{\sin\Delta\alpha}\right] \quad (17)$$

and $$\Delta\beta_1 = \cos^{-1}\left[\frac{\cos\alpha_{b1}\cos\xi_{b3} - \cos\alpha_{b3}\sin\xi_{b1}}{\sin\Delta\alpha \cdot \sin\alpha_{Q1}}\right] \quad (18)$$

Since $\beta_{Q1}$ can be inferred from the image as follows:

$$\beta_{Q1} = \beta_{b1} - \Delta\beta_1 \quad (19)$$

the spin can be computed from Equations (8), (11), and (17)–(19).

3.2 Dual Imaging Sensors

Similarly, if a second image sensor 46 located at the $Q_{2i}$ in XZ-plane, the coordinates of $Q_2$ and its adjacent grid points can be measured. Note that $\alpha_{Q1}$ and $\alpha_{Q2}$ can be rewritten from Equations (3) and (4) by replacing the subscripts "ei" to "Q1" and "ej" to "Q2" respectively:

$$\cos\alpha_{Q1} = \cos A_{Q1} \cos A + \sin A_{Q1} \cos \Phi \quad (20)$$

$$\cos\alpha_{Q2} = \cos A_{Q2} \cos A + \sin A_{Q2} \cos \Theta \quad (21)$$

For a given design, the angle A, $\Phi$, and $\Theta$ can be solved from the three simultaneous Equations (1), (20), and (21) in terms of the angles $\alpha_{Q1}$ and $\alpha_{Q2}$. For the case of $A_{Q1} = A_{Q2}$, the position of the motor shaft can be determined by $$\cos\Phi = \frac{1}{\sin A_{Q1}}(\cos\alpha_{Q1} - \cos A_{Q1}\cos A) \quad (22)$$

and $$\cos\Theta = \frac{1}{\sin A_{Q1}}(\cos\alpha_{Q2} - \cos A_{Q1}\cos A) \quad (23)$$

The angle A is given by $$\cos A = \frac{M \pm (M^2 - N)^{\frac{1}{2}}}{(1 + \cos^2 A_{Q1})} \quad (24a)$$

where $$M = \cos A_{Q1}(\cos\alpha_{Q1} + \cos\alpha_{Q2}) \quad (24b)$$

and $$N = (1 + \cos^2 Q1)(\cos^2\alpha_{Q1} + \cos^2 A_{Q1} - \sin^2 A_{Q1}). \quad (24c)$$

There are two possible solutions in Equation (9). The locations of $Q_{1i}$ and $Q_{2i}$ are designed so that the correct solution can be determined by examining the feasible range of the center P for a given range of the shaft inclination.

As shown in FIG. 2A, the XZ-plane intersects the vw-plane along the line $Of_5$. Let $f_6$ be a point on the vw-plane at which a circle passing through $Q_2$ and P intersects. The spin angle can be computed from the second image sensor 46 as follows:

$$\phi = \beta_{Q2} + |\beta_{f25}| \pm |\Delta\phi_2| \quad (25)$$

where $\beta_{f25}$ and $\Delta\Phi$ are the angles between $Of_2$ and $Of_5$, and $Of_5$ and $Of_6$, respectively. Using a similar approach as developed with a single image sensor 44, $$\cos\Delta\phi_2 = \frac{1}{\sin^2\alpha_{Q2}}\{\cos A_{Q2}(\cos\alpha_{Q2}\cos A + \sin\alpha_{Q2}\cos A_{f5}) + \quad (26)$$

$$\sin A_{Q2}(\cos\alpha_{Q2}\cos\Theta + \sin\alpha_{Q2}\sin A_{f5}) - \cos^2\alpha_{Q2}\},$$

$$\beta_{Q2} = \beta_{b5} - \Delta\beta_2, \quad (27a)$$

and $$\Delta\beta_2 = \cos^{-1}\left[\frac{\cos\alpha_{b5}\cos\xi_{b7} - \cos\alpha_{b5}\sin\xi_{b7}}{\sin\Delta\alpha \cdot \sin\alpha_{Q2}}\right] \quad (27b)$$

3.3 Moving Grid Pattern

For a given sensor design, the known parameters are $\Delta\alpha$, $\Delta\beta$, $R_1$, $A_{Q1}$, and $A_{Q2}$. The geometrical relationships derived in the previous sections 3.1 and 3.2 provide a means to determine the rotor orientation at a particular time instant t. The grid pattern 42, however, may move with respect to the optical center. If the optical center remains in the grid element in the new time step $t+\Delta t$, only the node distances $r_{obj}(b_1)$ and $r_{obj}(b_3)$ are required to be recomputed. In general, these variables must be recalculated if the optical center is out of the original grid element bounded by the four nodes. In order to update the variables for a new time step $t+\Delta t$, a method has been devised to locate the four "new" nodes around the image center.

Figure 2C:
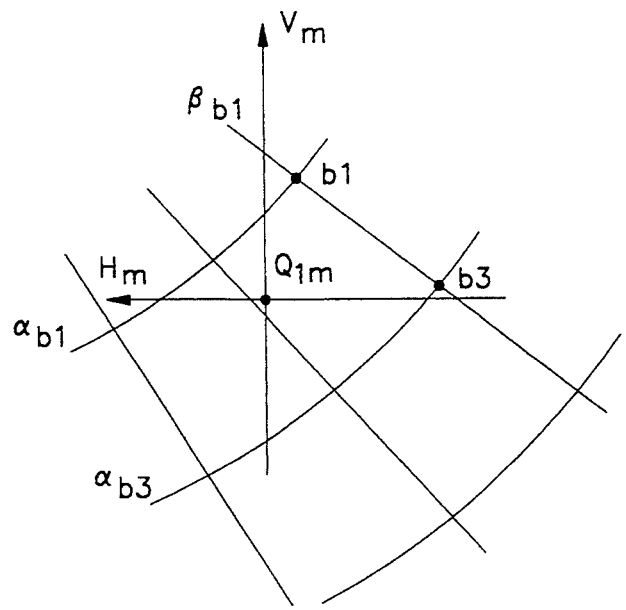
FIG. 2C is a graphical diagram showing a grid pattern image at time t.
Figure 2D:
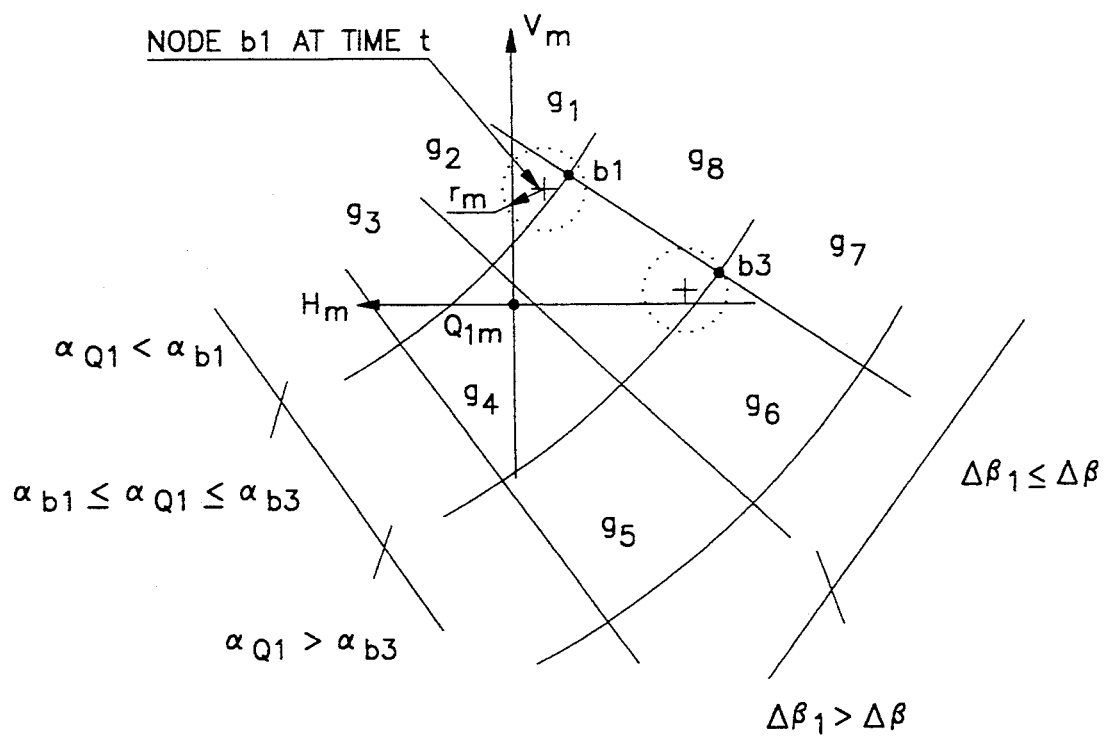
FIG. 2D is a schematic diagram showing the grid pattern image at time t+Δt.

FIGS. 2C and 2D show two consecutive images at the time t and $t+\Delta t$, respectively. These images are shown in the memory coordinate frame $H_m V_m$, where $Q_{1m}$ denotes the corresponding image center. The method is based on examining whether the $\beta_{b1}$ line (connecting the nodes $b_1$ to $b_3$) crosses the positive or the negative sides of the coordinate frame HV. At the time step $t+\Delta t$, the grid pattern 42 may move so that the image center may appear in one of the eight neighboring elements $g_1$–$g_8$ or remain in its original element. Consider that the image center at $t+\Delta t$ is in the grid element $g_4$ as shown in FIG. 2D, where the dotted circle centered at the original node represent a bounded region in which the node may displace within the time interval $\Delta t$. The radius of the bounded region, as denoted by $r_m$, in FIG. 2D depends on the maximum displacement and velocity for a given sensor design. At $t+\Delta t$, the image processing algorithm searches for a node within the bounded circular regions, and compute b for the variables $\Delta\beta_1$ and $\alpha_{Q1}$ which are defined in FIG. 2B. If $Q_{1m}$ is in one of the grid elements $g_3$, $g_4$, and $g_5$, the value of $\Delta\beta_1$ will be greater than that of $\Delta\beta$. Similarly, based on the definition of $\alpha_{Q1}$, the grid element which contains the image center $Q_{1m}$ can be inferred by comparing the value of $\alpha_{Q1}$ against those of $\alpha_{b1}$ and $\alpha_{b3}$. These results are summarized in FIG. 2D.

Figure 2E:
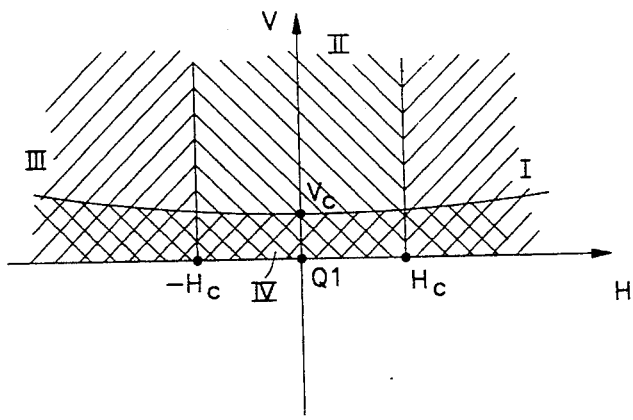
FIG. 2E is a graph showing feasible regions of projected point P on the HV-plane of FIGS. 2B through 2D.
Figure 2F:
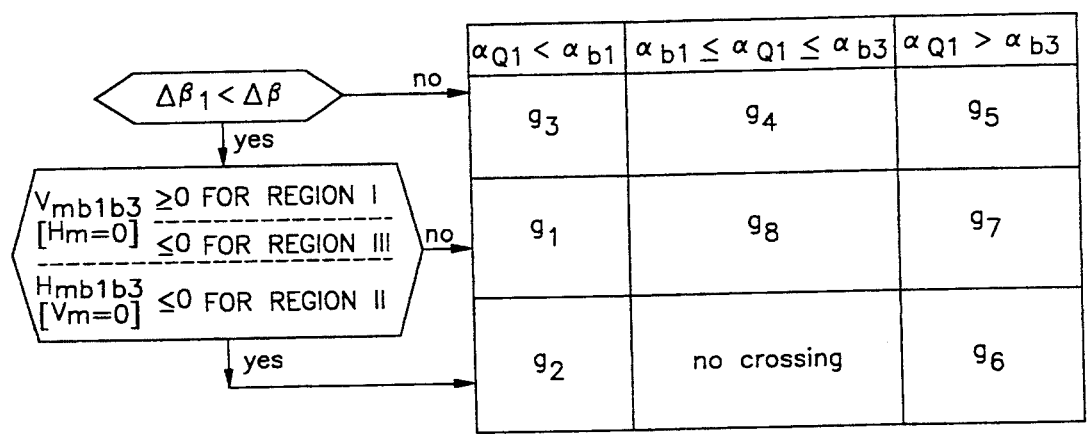
FIG. 2F is a flowchart illustrating the tracking of a grid pattern element on the grid pattern of FIG. 2A.

In order to make a distinction between grid elements ($g_1$, $g_8$, $g_7$) from that ($g_2$, $g_6$), the projection of the center P on the HV-plane is divided into three regions as shown in FIG. 2E. The three regions denoted as I, II, and III are regions on which the projection of the center P could possibly lie on the HV-plane. Note that the v-axis is in the XY-plane. If $Q_{1m}$ remains in the original grid element, $g_2$ or $g_6$, the intersection between the $\beta_{b1}$-line and the $H_m$ and $V_m$ axes must satisfy the following conditions: (1) The $\beta_{b1}$-line intersects the positive $V_m$ axis and negative $H_m$ axis if the projection of P is in the right half of the positive HV plane. (2) The $\beta_{b1}$-line intersects the negative $V_m$ axis and negative $H_m$ axis if the projection of P is in the left half of the positive HV plane. An algorithm to determine the grid element is summarized in FIG. 2F.

The allowable velocity of the orientation sensor 40 increases with a larger grid spacing for a given area and a short incremental time for the image processing and computation. On the other hand, the resolution is improved with a decrease in grid spacing, for the same surface area. By preferably using two image sensors, 44, 46, and two different kinds of grid lines, the allowable speed of the system can be increased without losing resolution. Different kinds of grid lines could include, for example, alternate coarse and fine grid lines, alternate light and dark grid lines, successive grid lines of different colors, or any other kind of grid line encoding methodology.

Worth mentioning is that, in order to further enhance rotor position computations, the rate of the relative movement between the rotor 18 and stator 12 may be further monitored by sensing the current induced in a secondary coil wound of one or more stator poles 14 under the influence of the magnetic field established between the stator poles 14 and the rotor poles 22. As is known by those skilled in the art, the mathematical integration of a rate yields position.

4. Vision System

Although significant research efforts have been directed towards the use of machine vision for tracking objects, the capabilities of commercial vision systems for use in real time control systems are still very limited. Many vision systems today normally employ a camera that outputs a video signal limited by the traditional television set, such as the RS-170 standard established in the 1950s, and must be accompanied by a frame grabber and a high performance host computer. In regard to the RS-170 standard, see *EIA Standard*, "Electrical Performance Standards—Monochrome Television Studio Facilities," Electronic Industries Association, Engineering Department, November 1957. Once the image has been digitized by the frame grabber, the image must then be transferred from the frame grabber over the data bus of the host computer to a processing unit. The data bus of microcomputers has generally restricted the throughput of image processing. High performance, RISC-based, digital signal processors (DSP) are increasingly being used as an add-on board to the host computer. DSPs permit high powered, mathematically intensive algorithms to manipulate and enhance images. Although many frame grabbers and DSPs operate at a rate typically faster than that of the host bus, the frame grabber and DSP must continually wait on data from the host computer. This wait represents crucial overhead in a real time environment.

To eliminate pixel data transfer via the data bus, many frame grabbers contain an on-board image memory (or, a video buffer), a digital-to-analog converter (DAC) to display images at 30 frames per second (fps), and an external connection to allow direct data transfer and communication between the frame grabber and the add-on DSP. Hence, the conventional vision approach generally requires a substantial amount of memory, data communication time, and sophisticated vision interpretation.

U.S. Pat. No. 5,146,340 to Dickerson et al. relates to a vision system for reading and processing pixel data. However, the Dickerson et al. system is limited in that only one image sensor can be used to provide real time response. As mentioned, in the preferred embodiment of the present invention, two image sensors 44, 46 are desirable.

Figure 3:
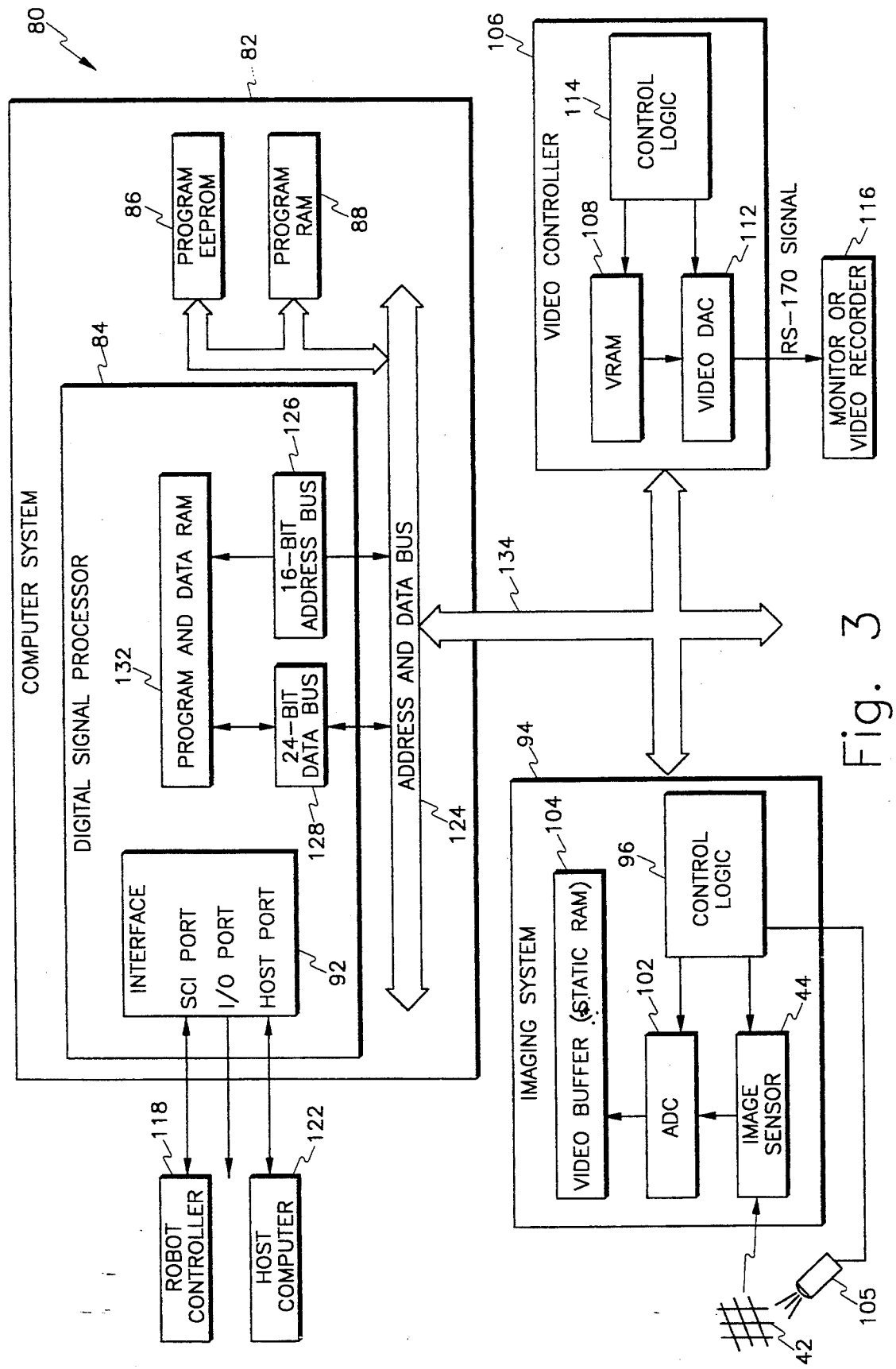
FIG. 3 is a block diagram illustrating a vision system for permitting real time processing and display of images, for instance, grid pattern images, in accordance with the present invention.

In order to overcome the limitations and problems associated with conventional vision systems for use with real time control of the ball-joint-like spherical motor 10, a real time vision system 80 has been developed and is illustrated in FIG. 3. The vision system 80 offers high performance and cost advantages by integrating processing elements and the image sensors 44, 46, thereby eliminating the need for the host computer, a frame grabber, and a dedicated computational processing system. The vision system 80 further minimizes image processing time and increases the frame rate. By directly controlling the image sensors 44, 46, frame rates much higher than 30 fps can be achieved.

Generally, the vision system 80 comprises (a) a computer system 82 having a DSP 84, an EEPROM 86, a scratch RAM 88, and a communications interface 92, (b) an imaging system 94 having control logic 96, an image sensor 44 which is preferably a charge couple device (CCD), a flash analog-to-digital converter (ADC) 102, a video buffer 104 (also, video RAM, or VRAM), and a light source 105 for projecting light onto an object, such as the grid pattern 42, under the control of the control logic 96, and (c) a real time video controller 106 having a VRAM 108 and a video DAC 112 controlled by control logic 114 in order to provide an RS-170 standard video signal to any display device 116, such as a conventional monitor or video recorder.

As shown in FIG. 3, the computer system 82 may be interfaced with a robot controller 118 or a host computer 122. Via the host computer 122, calibration and/or image analysis can be performed and application specific software may be implemented. Furthermore, the computer system 82 provides a direct software control of image sensor scanning and integration time, control of the intensity of the collocated illumination, and control of the real time execution of a user selectable vision algorithm embedded in the EEPROM 86. In essence, all of the real time processing is performed in the computer system 82 independently of and without relying upon any other system or computer.

The DSP 84 is preferably a Motorola 56-bit digital signal processor DSP56001. However, many other suitable DSPs are commercially available, including but not limited to, the Motorola DSP96002, Texas Instruments TMS320, or AT&T DSP32.

In the DSP 84 of FIG. 3, a combined address and data bus is indicated by reference numeral 124. The address bus 126 is 16 bits and the data bus 128 is 24 bits. The internal accumulators are 56 bit. The DSP 56001 processor 84 has 64K words (24 bit) of program memory space and two separate 64K words of data memory within an on-board RAM 132. With two banks of 64K words of RAM, the digital signal processor 84 is well suited for stereo and 24 bit color sensing. The DSP 84 also has 24 I/O pins on the communications interface 92 which can be configured for various functions, for example, serial communications and/or parallel I/O.

The imaging systems 94 can communicate image information (pixels) directly to the computer system 82 without prior storage in the local video buffer 104, allowing for direct processing of data by the computer system 82, if desired. Moreover, any number of imaging systems 94 may be interfaced with the external system bus 134. Thus, data from any number of image sensors 44, 46 may be sensed and quickly analyzed by the vision system 80. As mentioned previously, the spherical motor needs only one image sensor 44, but preferably two image sensors 44, 46. Hence, in the preferred embodiment, the vision system 80 comprises two parallel imaging systems 94, one dedicated to each image sensor 44, 46.

Figure 4:
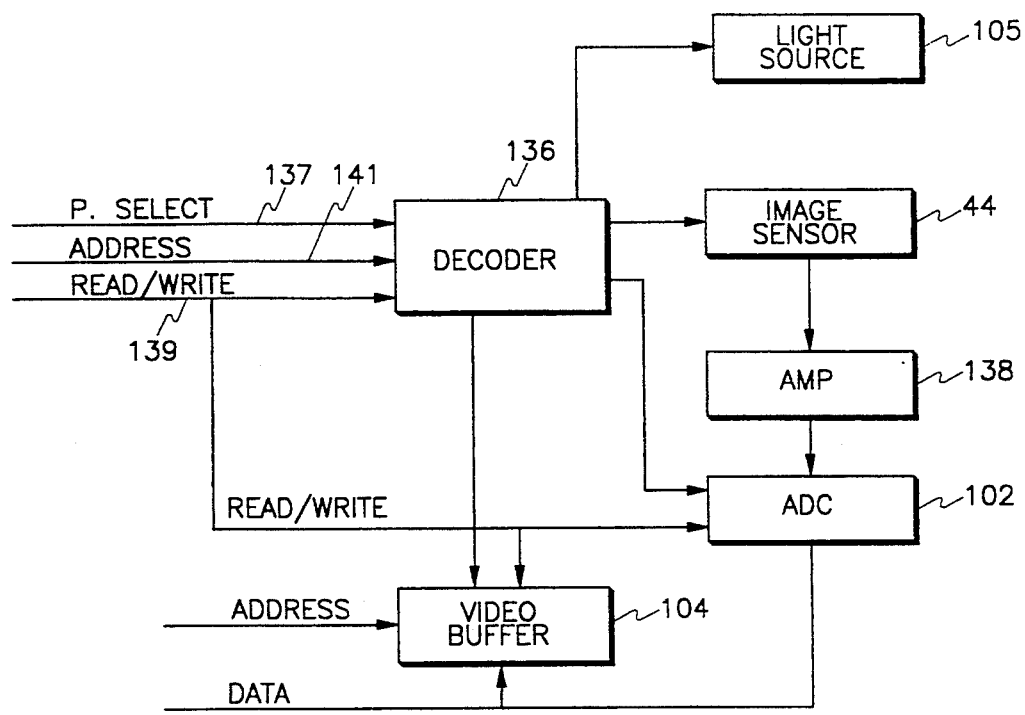
FIG. 4 is a block diagram of an imaging system of FIG. 3.

FIG. 4 illustrates a block diagram of the imaging system 94. A decoder 136, preferably a Texas Instruments ED1810 programmable logic array (PLA), receives a peripheral select (P.SELECT) signal 137, a read/write signal 139, and an address signal 141 from the DSP 84 via the system bus 134. The imaging system 94 is uniquely identified by a specific peripheral select signal 137. The decoder 136 decodes control signals from the system bus 134 in order to control the image sensor 44, the ADC 102, and the video buffer 104.

Specifically, the decoder 136 sends control signals to the image sensor 44 to initiate row shifts and column shifts in response to commands from the DSP 84. Particular row shifts and column shifts enable retrieving only a specific relevant area A from an image, as will be further discussed in detail relative to FIG. 9. The decoder 136 also provides control signals to the ADC 102 for performing an analog-to-digital conversion synchronized with row shifts. Finally, the decoder 136 enables the video buffer 104 when the DSP 84 reads or writes data to the video buffer 104.

The image sensor 44 is preferably a Texas Instruments TC211 CCD. The TC211 CCD is a small area image sensor with 192×165 active pixels. The output of the TC211 CCD is conditioned by an internal high gain bandwidth amplification circuit 138 and then sampled by a flash ADC 102, for example, a Motorola MC10319 ADC capable of sampling at up to 25 megahertz. The digitized image is then stored in the video buffer 104.

It should be noted that when pixel data is stored or processed in the vision system 80, it is first immediately sent to the DSP 84 and not stored as yet. After reaching the DSP 84, if the pixel data is to be stored, then it is transferred from the DSP 84 to the video buffer 104 for storage. Further, if the pixel data is to be processed, then it is immediately processed by the DSP 84. The foregoing architecture and functionality is described in further detail relative to the image processing algorithm 220 hereinafter. Moreover, the architecture and functionality permits real time operation of the vision system 80 and constitutes a significant improvement over the vision system described in U.S. Pat. No. 5,146,340 to Dickerson et al., which requires pixel data to be stored in a video buffer before processing of pixel data can commence.

Figure 5:
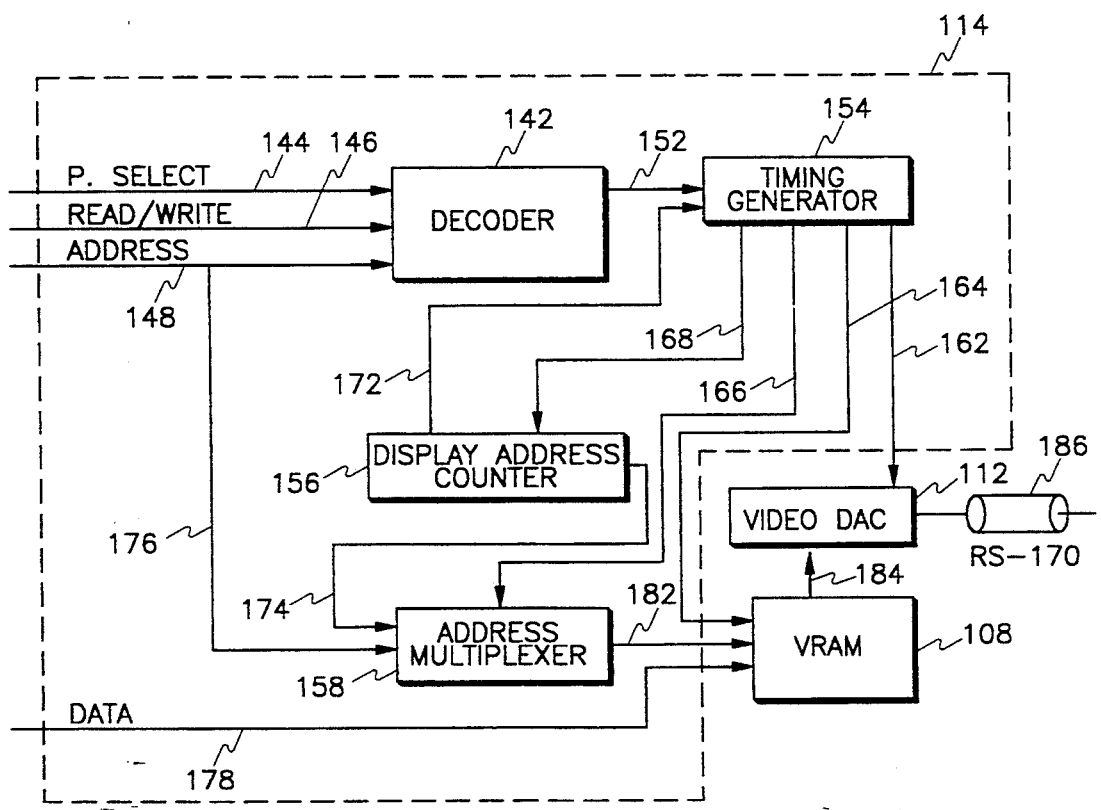
FIG. 5 is a block diagram of a real time video controller of FIG. 3.

A block diagram of the video controller 106 is illustrated in FIG. 5. As shown in FIG. 5, control logic 114 comprises a decoder 142, a timing generator 154, a display address counter 156, and an address multiplexer 158. The decoder 142 is preferably a Texas Instruments ED1810 PLA.

In operation, the decoder 142 receives a peripheral select (P.select) signal 144, a read/write signal 146, and an address signal 148 from the system bus 134. The video controller 106 is uniquely identified by a specific peripheral select signal 144. The decoder 142 provides a write enable 152 for triggering operations for writing image data in the VRAM 108. The write enable 152 is received by the timing generator 154. The timing generator 154 controls the VRAM 108, the video DAC 112, the display address counter 156, and the address multiplexer 158. In the foregoing regard, the timing generator 154 sends horizontal sync (HSYNC), blanking, and clock signals to the video DAC 112, as indicated by a reference arrow 162. The timing generator 154 sends read/write enable, row address select (RAS), and column address select (CAS) signal to the VRAM 108, as indicated by reference arrow 164. The timing generator 154 sends row/column address select and CPU/display address select signals to the address multiplexer 158, as indicated by a reference arrow 166. Further, the timing generator 154 communicates a clear counter signal 168 to the display address counter 156. As further shown, the timing generator 154 receives an EPROM address 172.

The display address counter 156 further communicates a display address output 174 to the address multiplexer 158. The address multiplexer 158 receives an image address written from the digital signal processor 84 on the line 176. Image data from the system bus 134 is communicated to the VRAM 108 as indicated by reference arrow 178. A coaxial cable 186 is shown for connecting any conventional display device 116 to the video DAC 112.

The RS-170 standard mandates a total of 420 scan lines for a complete frame, including the vertical blanking interval. An interlaced scheme is used in the RS-170 standard, wherein each frame is divided into two identical fields of 210 scan lines. In accordance with the present invention, only 45 of the 210 scan lines are used to display image characteristic data. Each scan line starts with a horizontal synchronization signal to synchronize the video source and the display device 116. During the synchronization period, the screen is blanked out and the electronic beam on the display device will move from the last displayed scan line to the beginning of the new scan line. At the end of each field, the scanning beam moves from the bottom of the screen to the top.

Once the DSP 84 signals the peripheral select 144 to select the video controller 106 for writing the image data, the image data is written into the VRAM 108 under the timing sequences triggered by the decoder 142. The addresses of the image data pixels are defined by the address multiplexer 158 under the control of the timing generator 154. If the peripheral select 144 is not enabled, the timing generator 154 continuously generates the required timing sequences to read the image data from the VRAM 108 and sends the same to the video DAC 112. The video DAC 112 receives digital image data, synchronization signals, and blanking inputs from the timing generator 154 and converts them into the appropriate voltage levels according to the combination of these signals.

It should be noted that the decoders 136, 142 in the respective imaging system 94 and video controller 106 may be implemented as merely a combinational logic network, a state machine, or even a microprocessor, for example, a Motorola 86000 processor.

5. Motor Control System

Figure 6:
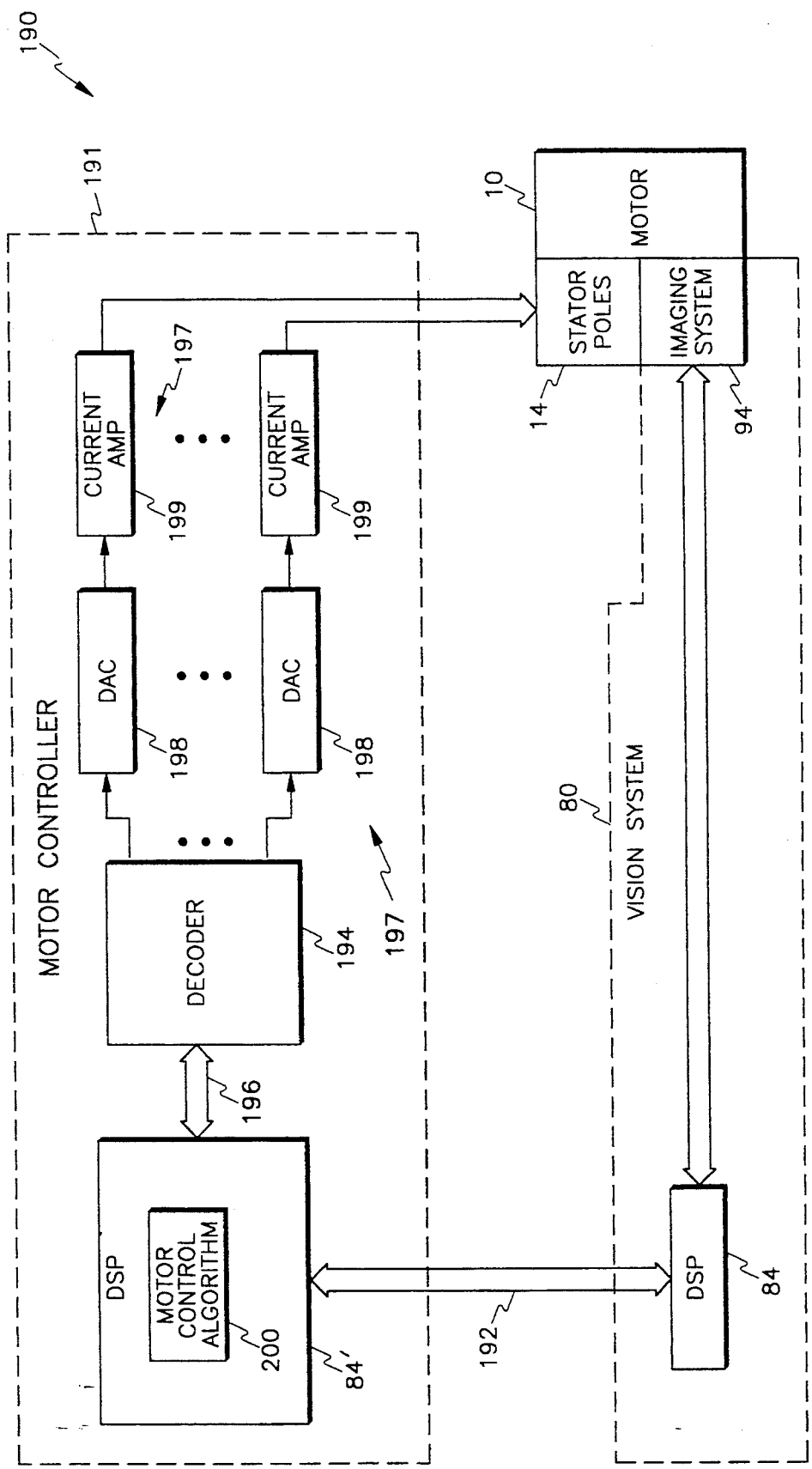
FIG. 6 is a block diagram of a motor control system for interfacing with the vision system of FIG. 3 for the purpose of controlling the spherical motor of FIG. 1A in real time.

A motor control system 190 for controlling the spherical motor 10 is illustrated in FIG. 6. The motor control system 190 has a motor controller 191 remotely interfaced with the vision system 80 by way of an external bus 192. Specifically, a DSP 84' of the motor controller 191 communicates with the DSP 84 of the remote vision system 80 via the external bus 192. The DSP 84 of the motor controller 191 communicates to a decoder 194 via a local bus 196. The decoder 194 controls a set of current signal generators 197 for each of the plurality of stator poles 14 (FIG. 1B). Each current signal generator 197 comprises a DAC 198 connected to a subsequent current amplifier (AMP) 199.

A motor control algorithm 200, in software or in hardware or both, is disposed or downloaded to the DSP 84' of the motor controller 191 for controlling the operation of the motor controller 191 based upon the rotor position information retrieved by the vision system 80. A variety of motor control algorithms 200 may be employed. An example of a novel motor control algorithm 200 is described in detail hereinafter relative to FIG. 10.

6. Operation

A. Loader Algorithm

Figure 7:
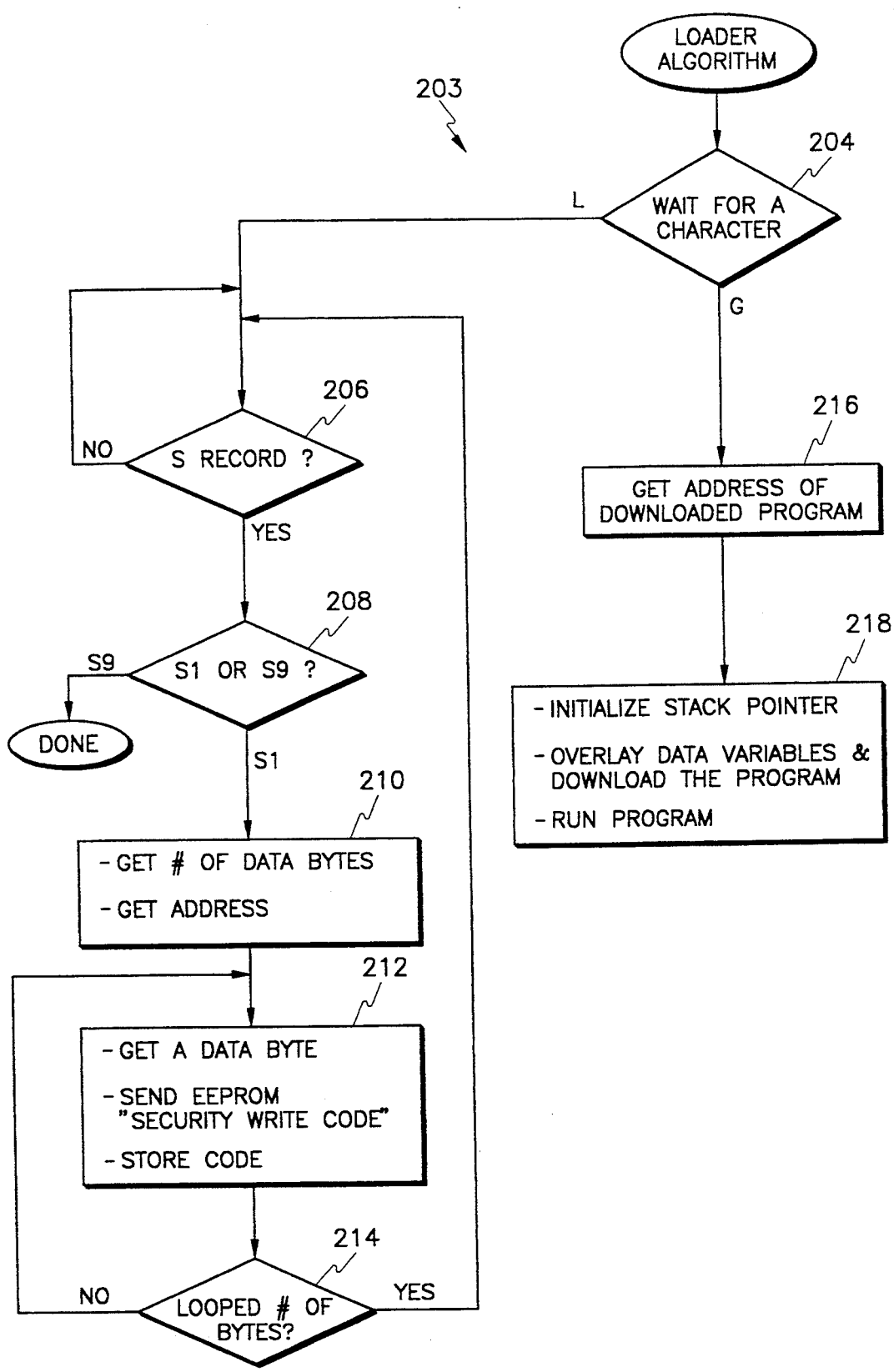
FIG. 7 is a flowchart illustrating a loader algorithm for downloading an image processing program from a host computer to the vision system of FIG. 3.

A loader algorithm 203 for downloading any program from the host computer 122 to the vision system 80 and/or the motor controller 191 is illustrated in FIG. 7. The loader algorithm 203 is preferably implemented in software. The loader software program is stored in the EEPROM 86 shown in FIG. 3. Once the vision system 80 is turned on, the loader software program is copied into the program RAM 88 so that the EEPROM 86 can be programmed under the control of the loader program in the RAM 88.

Referring to FIG. 7, the loader algorithm 203 is initiated by a character sent from the host computer 122 to the vision system 80. The loader algorithm 203 has a "load" (L) sequence set forth in flowchart blocks 206–214 and a "go" (G) sequence set forth in flowchart blocks 216–218. Either of the foregoing sequences may be initiated by the host computer 122. During the load sequence, the loader algorithm 203 causes the host computer 122 to send the program to be transferred to the communications interface 92, through the bus 124, and finally to the program EEPROM 86 (92, 124, 86 in FIG. 3). Moreover, during the go sequence, as set forth in flowchart blocks 216, 218, the loader algorithm 203 writes the transferred program from the EEPROM 86 to the RAM 88. The RAM 88 is used for running the transferred program because a RAM is much faster than a ROM.

Worth noting is that a library of processing algorithms for optimizing performance may be maintained in the host computer 122 and downloaded to the program EEPROM 86 for particular processing tasks. Furthermore, once the algorithms and data are downloaded into the EEPROM 86, the vision system 80 can function as an intelligent sensing system and communicate directly with the robot controller 118 without the host computer 122.

B. Image Processing Algorithm

A novel image processing algorithm 220 for operating the imaging system 94 will now be described relative to FIG. 8, which has been broken down into successive views on respective FIGS. 8A and 8B. The image processing algorithm 220, which is capable of being transferred by the loader algorithm 203, is stored in the program EEPROM 86 of the computer system 82, and is run by the DSP 84 while in the program RAM 82. A significant aspect of the image processing algorithm 220, which is elaborated upon in detail hereinafter, is that partial frames (pertinent areas) of an image are captured instead of the customary full frame and the partial frames are directly sent to the DSP 84, thereby reducing the cycle time required to capture and process an image.

Figure 8A:
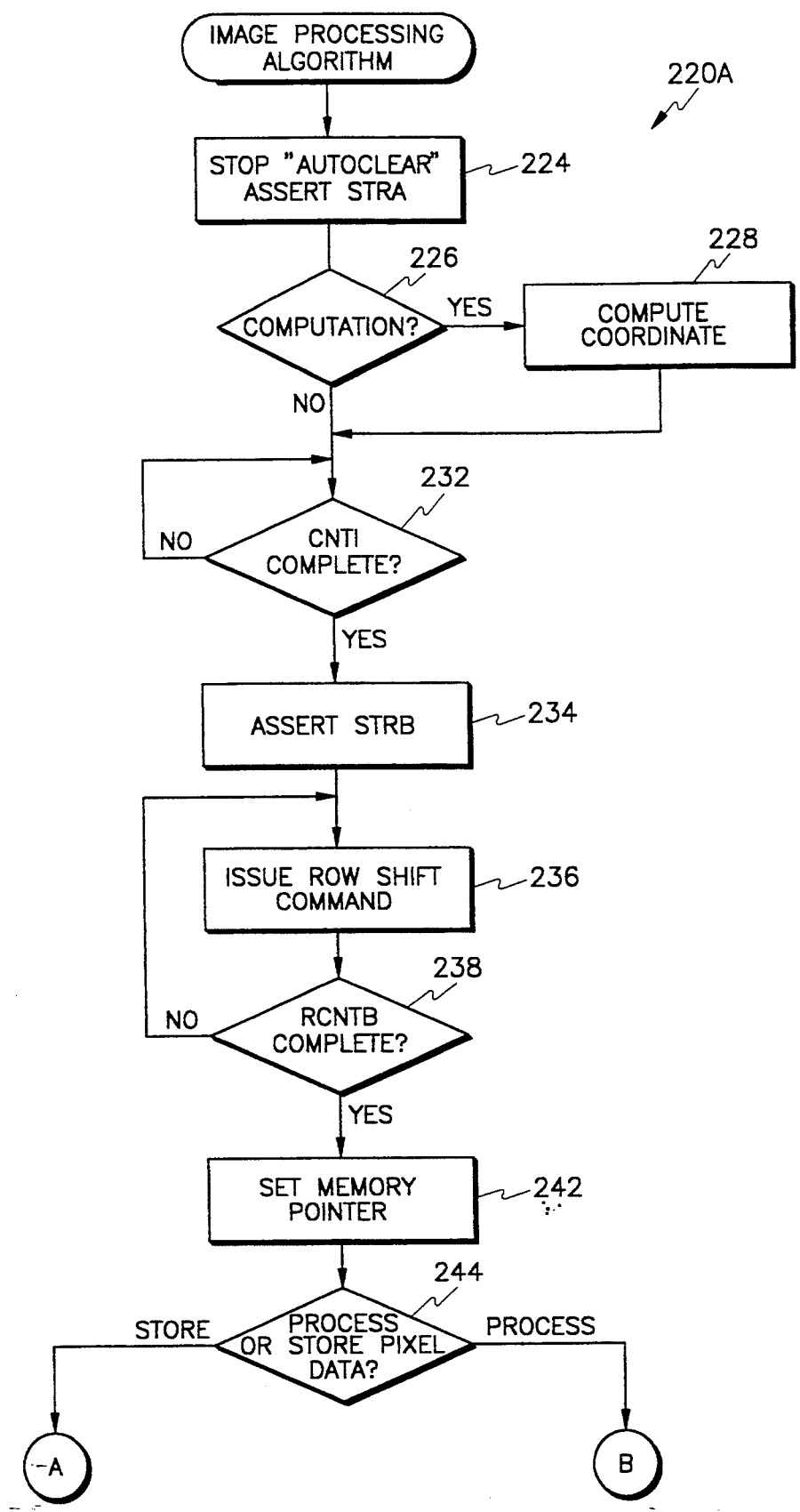
FIG. 8 is a flowchart illustrating operation of an image processing algorithm by the vision system of FIG. 3.
Figure 8B:
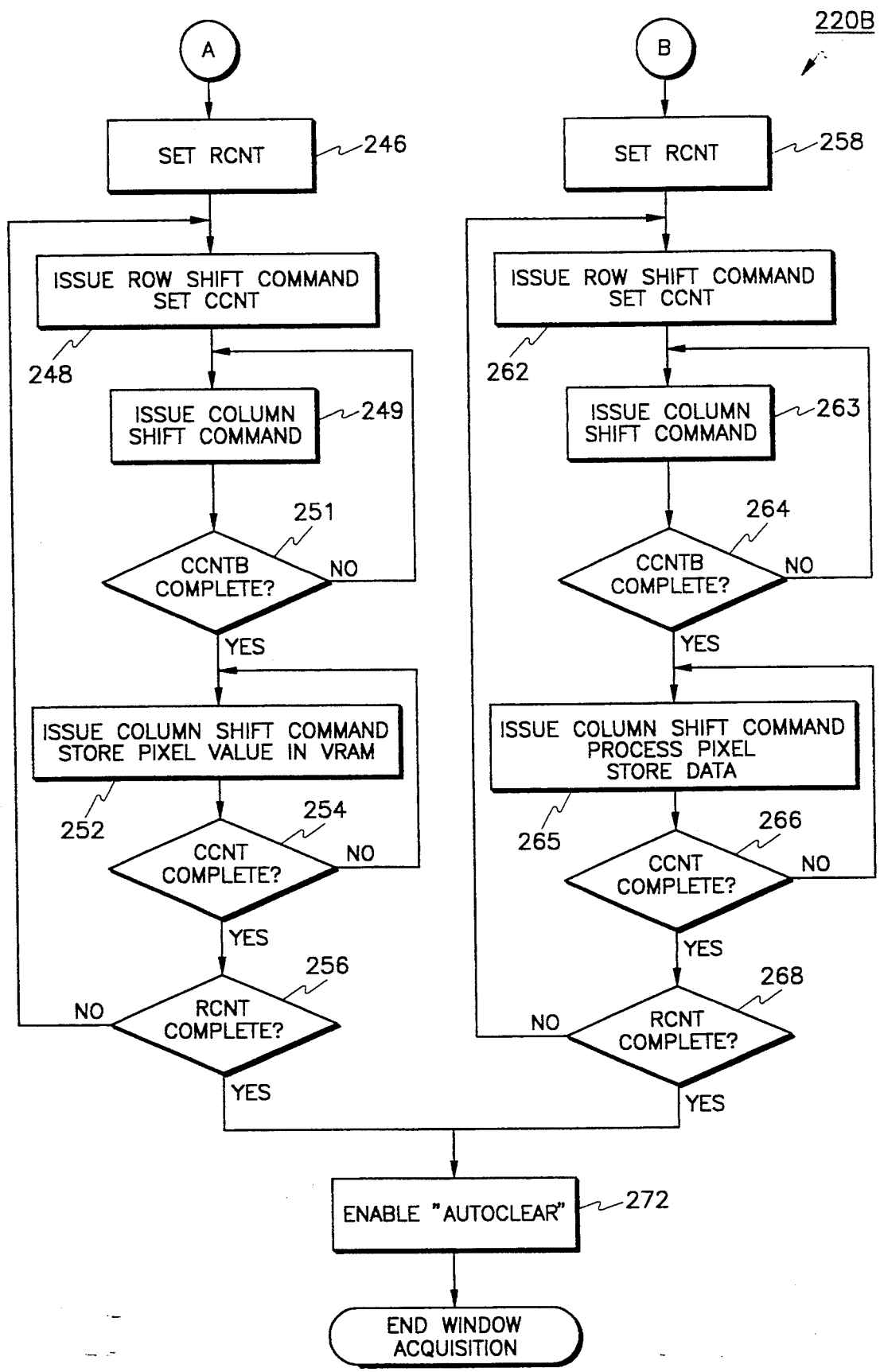

With reference to FIG. 8A, an image of the grid pattern 42 is acquired by the image sensor 44 by first initializing the image sensor 44 by an autoclear clearing process, as indicated in a flowchart block 224. Specifically, in response to a command from the DSP 84 (FIG. 3), the decoder 136 (FIG. 4) provides a control signal to the image sensor 44 for shifting out a row without storing the data, thereby "autoclearing", or in other words, not allowing a charge (image) to accumulate in the image sensor 44.

After the autoclear clearing process, an STRA command is asserted to the DSP 84 for setting a couple of time intervals used for subsequent timing operations and for sending a signal from the DSP 84 to the image sensor 44 to charge the strobe. A CNTI time interval is needed for charging the light strobe and for light integration, by the image sensor 44. Light integration refers to the concept of capturing light over time and hence capturing an image in the image sensor 44.

Next, as indicated in flowchart blocks 226, 228, while the image sensor 44 is illuminating the grid pattern 42, the DSP 84 computes the position, or coordinate, of the motor shaft 24 based upon previous grid pattern data stored in the video buffer 104 of the imaging system 94. The foregoing feature is a significant aspect of the present invention in that extremely high performance is achieved so as to realize real time operation. Computations by the DSP 84 occur concurrently with the retrieval of images by the imaging system 94.

As indicated in a subsequent flowchart block 232, it is determined whether the CNTI time interval needed for light integration has completed. Generally, the time for computing a coordinate of the motor shaft 24 takes less time than light integration.

After light integration has completed, an STRB command is asserted, as indicated in a flowchart block 234, causing the DSP 84 to send a signal to the imaging system 94 to discharge the stroke.

Figure 9:
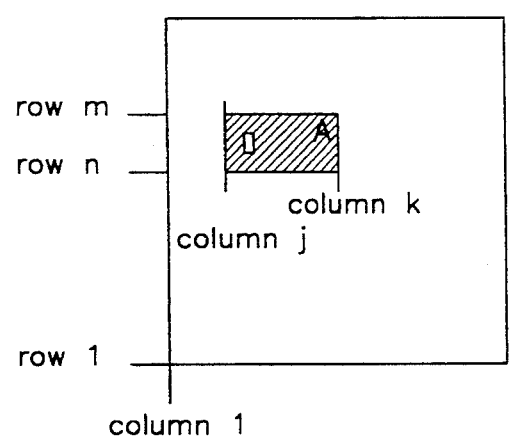
FIG. 9 is a schematic diagram of an approximate area A of an image which is retrieved in accordance with the image processing algorithm of FIG. 8.

While the image is being acquired, the DSP 84 determines an approximate area where the object is located. The approximate area A is defined by row n to row m and column 1 to column p, as shown in FIG. 9. U.S. Pat. No. 5,146,340 to Dickerson et al., which is incorporated herein by reference, describes an image reading system wherein after ascertaining the area of an image where an object is located, the system is speeded up to read image signals outside the area at a high speed and to read those image signals inside the area at a slower speed. This invention can be applied herein so that the area A identified between rows m to n and columns j to k, as shown in FIG. 9, is read at a much higher speed than the remainder of the image. However, it should be noted that this implementation is optional and that the present invention is much more flexible in that a specific range of columns can be excised from the image, unlike in the foregoing patent where the excised portion always must start at column 1.

As indicated in a flowchart block 236 of FIG. 8A, the image processing algorithm 220 issues a row shift command to the DSP 84, thereby causing the decoder 136 to order the image sensor 44 to reel through rows 1 to n. As mentioned, the preceding process may be performed at a high speed, if desired, because the associated image region between rows 1 to n is unimportant. An RCNTB time interval is the amount of time needed to shift up to row n at high speed. As indicated in a flowchart block 238, the algorithm 220 waits until the row shift is complete by monitoring the RCNTB time interval.

Next, a memory pointer is set, as set forth in a flowchart block 242, so that only the area A beyond row n is saved in the video buffer 104.

Pixel data is now either stored or processed, as indicated at a flowchart block 244. Storage of pixel data occurs as set forth in flowchart blocks 246 through 256 and processing of pixel data occurs as set forth in flowchart blocks 258 through 268.

When pixel data is stored, an RCNT time interval is calculated and set for indicating the time necessary to shift out rows n through m. A row shift command is subsequently asserted, as indicated in a flowchart block 248, to read from, or shift out, rows n to m. Rows n to m may be shifted out at a relatively slow scanning speed, if desired; to insure image integrity.

A CCNT time interval is calculated and set for indicating the time necessary to shift out columns j to k. In turn, a column shift command is issued in order to shift out the area A between columns j to k. More specifically, as indicated in the flowchart block 249, the image processing algorithm 220 issues a column shift command to the DSP 84, thereby causing the DSP 84 to order the imaging system 94 to reel through columns 1 to j. As mentioned, the preceding process may be performed at a high speed, if desired, because the associated image region between columns 1 to j is unimportant. A CCNTB time interval is the amount of time needed to shift up to column j at high speed. As indicated in the flowchart block 251, the algorithm 220 waits until the column shift is complete by monitoring the CCTNTB time interval. Furthermore, the columns j to k may be shifted out at a relatively slow scanning speed, if desired, to insure image integrity.

After the entire area A has been shifted out row-by-row from row n to row m and with a row length spanning from column j to k, the autoclear clearing process is again initiated to end the image acquisition, as indicated by a flowchart block 272.

When pixel data is processed, the procedure is very similar to that for storing pixel data, as described above. Specifically, the flowchart blocks 258 through 268, setting forth the preferred procedure for processing pixel data, corresponds respectively with flowchart blocks 246 through 256, setting forth the preferred procedure for storing pixel data. However, at flowchart block 264, where columns are shifted out, the pixel data (for instanced 8-data bits) is processed and then directly stored.

Thus, with the image sensor 44 under control of the image processing algorithm 220, partial frames can be captured instead of the customary full frame, reducing the cycle time required to capture and process an image. The ability to shift out partial frames is ideal for high speed tracking applications where the approximate location is known from a prior image. By reducing the time to capture an image, the effective frame rate is increased. For example, shifting out one-fourth of an image can increase the frame rate up to 480 fps, not including the time required for illumination and image processing. This frame rate is 16 times the rate achievable from the RS-170 standard.

C. Motor Control Algorithm

Figure 10:
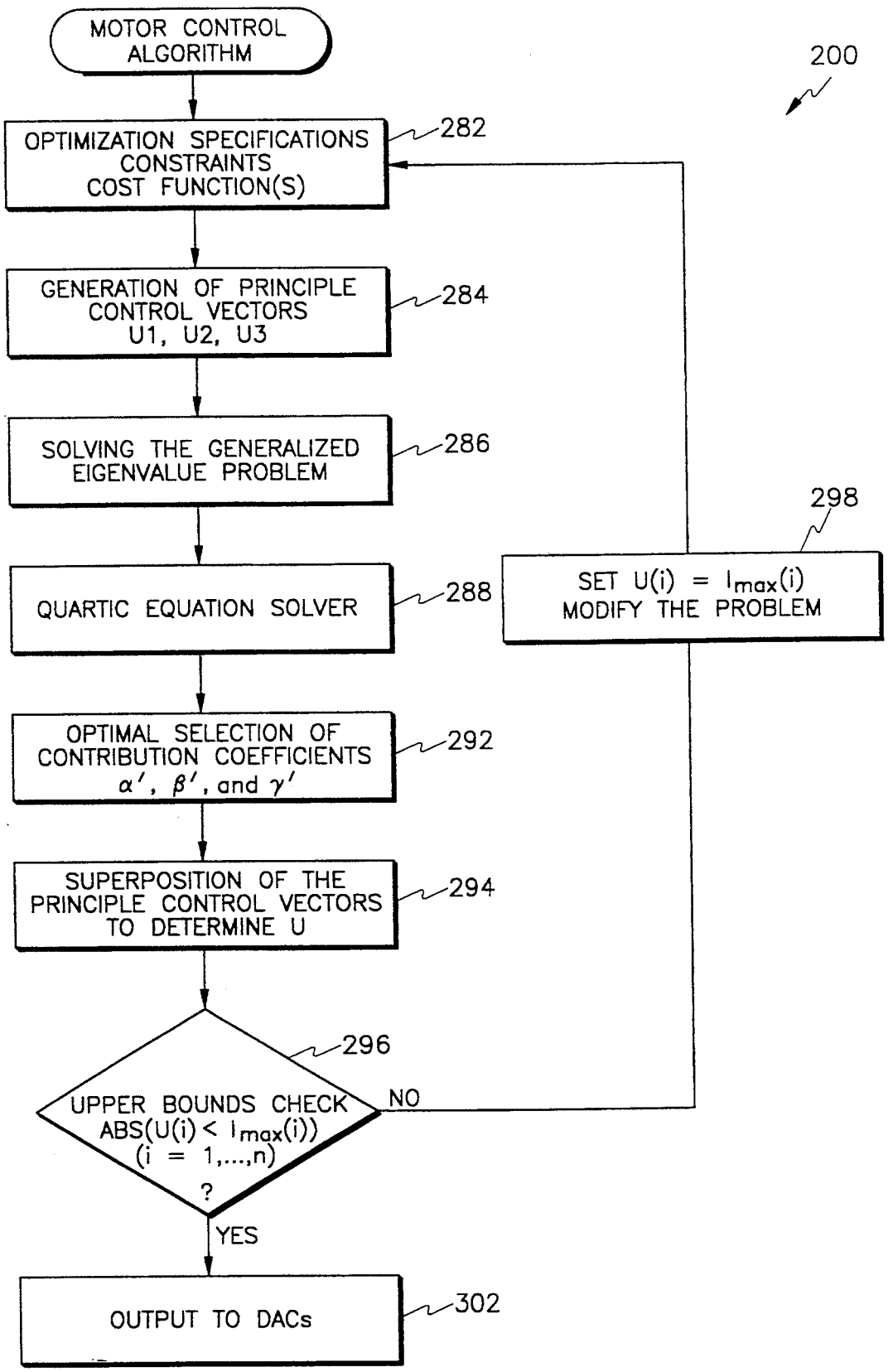
FIG. 10 is a flowchart illustrating an optimization algorithm for the motor controller of FIG. 6.

FIG. 10 is a flowchart illustrating a novel motor control algorithm 200 for optimizing performance of the motor controller 191 of FIG. 6. The motor control algorithm 200 initially determines an actuating torque vector $T=(T_1, T_2, T_3)$ ($T_1, T_2, T_3$ are orthogonal vector components) so that the spherical motor 10 follows a desired trajectory, as indicated in flowchart block 282. Many algorithms are available in the industry for the foregoing purpose. For example, consider a computed torque method for the control strategy as described in Spong et al., *Robot Dynamics and Control*, John Wiley and Sons, 1989, which is incorporated herein by reference as if set forth in full hereinbelow.

In the preferred embodiment, the actuating torque vector T is determined as described hereafter. The torque generated by the electromagnetic system of the spherical motor 10 is given by the following equation which is derived by using the principle of conservation of energy:

$$T = \frac{1}{2} \sum_{i=1}^{m} \sum_{j=1}^{n} \left[ (M_{sj} + M_{ri} - V)^2 \frac{dP(\phi)}{d\phi} \bigg|_{\phi=\phi_{ij}} e^{ij} \right]$$

$$e_{ij} = \frac{C_{sj} \times C_{ri}}{R^2 \sin\phi_{ij}}$$

where $M_{sj}$ and $M_{ri}$ denote the magneto-motive-forces (mmf's) or the electrical inputs to the $j^{th}$ stator pole 14 and the $i^{th}$ rotor pole 22 respectively; V is the magnetic potential at the stator shell with respect to the rotor center of rotor 18; $P(\phi)$ is the permeance or the reciprocal of the air gap between the stator 12 and the rotor poles 22 as a function of the angle $\phi$ between the position vectors characterizing the rotation and rotor poles 22; $C_{sj}$ and $C_{ri}$ are the position vectors of the $j^{th}$ stator pole 14 and the $i^{th}$ rotor poles 22 respectively; $\phi_{ij}$ is the angle between $C_{sj}$ and $C_{ri}$; and R is the radius of the rotor 18. $P(\phi)$ can be determined by using numerical computation or experimentally for a given design.

In order to obtain an optimal solution to the inverse torque model, the torque equation is presented in quadratic form. Further, for clarity in illustrating the inverse torque model, only current sources are used and the mmf's of the pole coils are treated as system input variables. Finally, in practice, it is desirable to have no wiring in the moving parts, and thus the rotor poles 22 comprise only simple iron cores with no excitation coils. With the foregoing parameters, the torque equation can be written in matrix form as follows:

$$T_I = \frac{1}{2} \underline{U}^T A_I \underline{U} \quad I = 1,2,3$$

where $$A_I = \sum_{j=1}^{n}\left[\sum_{i=1}^{m}\frac{dPC\phi 1}{d\phi}\bigg|_{\phi=\phi_{ij}}(e_{ij}\cdot u_I)\right](a-c_j)\cdot(a-c_j)^T,$$

$$a = [a_i \ldots a_j \ldots a_n]^T,$$

$$A_j = \frac{\sum_{i=1}^{m} P_{ij}}{\sum_{i=1}^{m}\sum_{j=1}^{n} P_{ij}},$$

$$\sum_{j=1}^{n} a_j = 1$$

and $$c_j = [00\ldots 0\underset{j^{th}}{1}0\ldots 00]$$

As indicated in flowchart blocks 284–302, the motor control algorithm 200 determines the optimal electrical current inputs for the n stator coils in order to generate the required actuating torque T with the least amount of energy possible given certain practical operating constraints. In essence, the methodology described hereafter in regard to flowchart blocks 284–302 is an optimization algorithm.

As indicated in flowchart block 284, the vector $U = (U_1\ U_2 \ldots U_n)$, called herein the "optimal principle control vector," is determined relative to the torque vector T. The optimal principle control vector U is an array which comprises a current value $U_i$, $i = 1, \ldots n$, for each of the n stator coils 14 situated about the periphery of the spherical stator 12.

For a specified torque $T \in \Re$, a control input $U \in \Re^n$ is determined which satisfies the constraint $$T_I = \tfrac{1}{2} U^T A_I U\ (A_I^T = A_I)$$

where $I = 1, 2, 3$ and where the notation $(\bullet)^T$ denotes the transpose of the vector or the matrix $(\bullet)$, and which simultaneously minimizes the cost function $$J = \tfrac{1}{2} U^T U$$

In the preferred embodiment, the foregoing cost function represents the total amount of energy input to the n stator poles.

For a specified torque T, the control vector U is given by the following equation:

$$U = \alpha' u_1 + \beta' u_2 + \gamma' u_3 \tag{28}$$

where $\alpha'$, $\beta'$, and $\gamma'$ are time-varying coefficients to be determined according to the three simultaneous torque constraint equations.

By substituting the expression for U into the torque equations, the following equation is derived:

$$\tfrac{1}{2}[\alpha',\beta',\gamma'][B_I][\alpha',\beta',\gamma']^T = T_I$$

where $I = 1,2,3$, $$[B_1] = \begin{bmatrix} 2 & u_1^T A_1 u_2 & u_1^T A_1 u_3 \\ u_2^T A_1 u_1 & 0 & u_2^T A_1 u_3 \\ u_3^T A_1 u_1 & u_3^T A_1 u_2 & 0 \end{bmatrix} =$$

$$\begin{bmatrix} 2 & \lambda_1^* u_1^T u_2 & \lambda_1^* u_1^T u_3 \\ \lambda_1^* u_2^T u_1 & 0 & u_2^T A_1 u_3 \\ \lambda_1^* u_3^T u_1 & u_3^T u_1 u_2 & 0 \end{bmatrix}$$

As indicated in flowchart block 286, the eigenvalues ($\lambda_i$, $i=1,2,3$) are found by the method described in the $$[B_2] = \begin{bmatrix} 0 & u_1^T A_2 u_2 & u_1^T A_2 u_3 \\ u_2^T A_2 u_1 & 2 & u_2^T A_2 u_3 \\ u_3^T A_2 u_1 & u_3^T A_2 u_2 & 0 \end{bmatrix} =$$

$$\begin{bmatrix} 0 & \lambda_2^* u_1^T u_2 & u_1^T A_2 u_3 \\ \lambda_2^* u_2^T & 2 & \lambda_2^* u_2^T u_3 \\ u_3^T A_2 u_1 & \lambda_2^* u_3^T u_2 & 0 \end{bmatrix}$$

$$[B_3] = \begin{bmatrix} 0 & u_1^T A_3 u_2 & u_1^T A_3 u_3 \\ u_2^T A_3 u_1 & 0 & u_2^T A_3 u_3 \\ u_3^T A_3 u_1 & u_3^T A_3 u_2 & 2 \end{bmatrix} =$$

$$\begin{bmatrix} 0 & u_1^T A_3 u_2 & \lambda_3^* u_1^T u_3 \\ u_2^T A_3 u_1 & 0 & \lambda_3^* u_2^T u_3 \\ \lambda_3^* u_3^T u_1 & \lambda_3^* u_3^T u_1 & 2 \end{bmatrix}$$

Appendix submitted herewith. Note that $[B_1] = [B_1]^T$ and the elements of $B_1$ have common factors $U_1^T u_2, u_2^T u_3, u_1^T w_3$. These properties greatly reduce the computation.

Hence, three unknown time-varying coefficients can be solved from the following three equations:

$$x^T[B_1]x = 2T_1 \tag{29a}$$

$$x^T[B_2]x = 2T_2 \tag{29b}$$

$$x^T[B_3]x = 2T_3 \tag{29c}$$

where $$x = [\alpha',\beta',\gamma']^T.$$

Equations (29a) and (29b) can be decoupled by noting that $$[B_1]v_j = \omega_j B_2 v_j \tag{30}$$

can be solved for the eigenvalues $\omega_j$ and the corresponding normal eigenvectors $v_j$ ($j=1,2,3$) which form $$\Gamma = [v_1\ v_2\ v_3]$$

such that $$\Gamma^T[B_1]\Gamma = I$$

and $$\Gamma^T[B_2]\Gamma = \text{diag}[\omega_1,\omega_2,\omega_3]$$

where the $\omega_j$ ($j=1,2,3$) are arranged such that $\omega_1 \leq \omega_2 \leq \omega_3$.

Thus, by means of the following linear transformation $$x = \Gamma y$$

where $y = [\alpha, \beta, \gamma]^T$. Equations (29a)–(29c) become $$y^T \Gamma^T B_1 \Gamma y = y^T y = 2T_1 \quad (31a)$$

$$y^T \Gamma^T [B_2] \Gamma y = y^T \begin{bmatrix} \omega_1 & 0 & 0 \\ 0 & \omega_2 & 0 \\ 0 & 0 & \omega_3 \end{bmatrix} y = 2T_2 \quad (31b)$$

$$y_T \Gamma^T [B_3] \Gamma y = y^T Q y = 2T_3 \quad (31c)$$

where $$Q = \Gamma^T [B_3] \Gamma = [v_i^T B_3 v_j]_{3 \times 3} = [q_{ij}]_{3 \times 3}$$

and i,j = 1,2,3. By substituting $\alpha, \beta, \gamma$, Equations (31a)–(31c) become $$\alpha^2 + \beta^2 + \gamma^2 = 2T_1 \quad (32a)$$

$$\omega_1 \alpha^2 + \omega_2 \beta^2 + \omega_3 \gamma^2 = 2T_2 \quad (32b)$$

$$q_{11}\alpha^2 + q_{22}\beta^2 + q_{33}\gamma^2 + 2q_{12}\alpha\beta + 2q_{13}\alpha\gamma + 2s_{23}\beta\gamma = 2T_3 \quad (32c)$$

Provided that not all the eigenvalues $\omega_j$ are equal, Equations (32a) and (32b) can be written as $$\alpha = (b_1 + b_2 \gamma^2)^{\frac{1}{2}} \quad (33)$$

$$\beta = (b_3 + b_4 \gamma^2)^{\frac{1}{2}} \quad (34)$$

where $$b_1 = \frac{2(\omega_2 T_1 - T_2)}{\omega_2 - \omega_1}, \quad b_3 = \frac{2(T_2 - T_1 \omega_1)}{\omega_2 - \omega_1}$$

$$b_2 = \frac{\omega_3 - \omega_2}{\omega_2 - \omega_1}, \text{ and } b_4 = \frac{\omega_1 - \omega_3}{\omega_2 - \omega_1}$$

Substituting for $\alpha$ and $\beta$ in Equations (33) and (34) respectively, and let $\gamma^2 = z$, a quartic equation of the form $$az^4 + bz^3 + cz^2 + dz + e = 0 \quad (35)$$

can be obtained. As indicated in flowchart block 288, the foregoing quartic equation (35) is now solved. The coefficients of the quartic equation (35) are algebraic functions of $q_{ij}$ and $b_k$ (i,j = 1,2,3; k = 1,2,3,4). The quartic equation (35) is solved for any real non-negative z within $$\frac{-b_1}{b_2} \leq z \leq \frac{-b_3}{b_4}$$

Next, as indicated in flowchart block 292, the three time-varying coefficients $\alpha'$, $\beta'$, and $\lambda'$ are determined by working backwards such that $$\gamma \rightarrow \alpha, \beta \rightarrow \alpha', \beta', \gamma'$$

There are several possible solutions for $\alpha', \beta', \gamma'$. A set of solutions is selected such that $$\min J = \min \frac{1}{2} \|U\|_2 - \min \frac{1}{2} \|\alpha' u_1 + \beta' u_2 + \gamma' u_3\| \quad (36)$$

namely, $$\frac{1}{2} \|U\| \leq \frac{1}{2} \{|\alpha'| \|u_1\| + |\beta'| \|u_2\| + |\gamma'| \|u_3\|\} =$$

$$\frac{T_1}{\lambda_1^*} |\alpha'| + \frac{T_2}{\lambda_2^*} |\beta'| + \frac{T_3}{\lambda_3^*} |\gamma'| = J^*$$

As indicated in the flowchart block 294, the three optimal principal control vector components $u_1$, $u_2$, and $u_3$ are inserted into the equation (28) in order to derive the control vector U. The control vector U is an array which comprises a current value U for each of the n stator coils 14.

Next, at a flowchart block 296, the current values $U_i$, where i = 1, . . . , n, for each of the n stator coils 14 are compared with a maximum allowable current level $I_{max}$. If a computed current value $U_i$ is greater than the maximum allowable current value $I_{max}$ for a particular stator coil 14, then the computed current value $U_i$ is replaced with the maximum allowable current value $I_{max}$, as indicated in a flowchart block 298. Finally, as shown in a flowchart block 302, the current values $U_i$, for i = 1, . . . , n, are fed to the n DACs 198 (FIG. 6) by way of the decoder 194 (FIG. 6).

It should be noted that the foregoing novel methodology involving the determination of torques and minimization of a cost function J(U) is equally applicable in other embodiments of a spherical motor which utilize a different rotor actuation means, i.e., an actuation means other than the electromagnetic actuation means utilizing stator and rotor poles 14, 22. Examples of other types of actuation means include pneumatic, hydraulic, or electrostatic systems.

Finally, it will be obvious to those skilled in the art that many other variations may be made to the preferred embodiments described above without departing from the novel teachings and principles of the present invention. All such variations are intended to be incorporated herein and within the scope of the present invention.

APPENDIX

GENERATION OF THE THREE OPTIMAL PRINCIPLE CONTROL VECTORS

Problem Statement

For a specified torque $T \epsilon R$, find a control input $u \epsilon R^m$ which satisfies the constraint $$T_I = \frac{1}{2} u^T A_I u \quad (A_I^T = A_I)$$

and simultaneously minimizes the following cost function, which is energy in the present case:

$$j = \frac{1}{2} u^T u$$

Theorem

Let u* be the optimal solution of the above problem then $$u^* = \left( \frac{2T}{\lambda^*(A)} \right)^{\frac{1}{2}} \bar{u}^* \quad \text{when } T \neq 0$$

-continued $$u^* = 0 \quad \text{when } T = 0$$

where $$\lambda^*(A) = \lambda_{max}(A)\mu(T) + \lambda_{min}(A)\mu(-T)$$

$\mu(.)$ is a unit step function, $\lambda_{max}(A)$ and $\lambda_{min}(A)$ are the maximum and minimum eigenvalues of A respectively; and u* is the Normalized eigenvector of the following eigenvalue problem $$A u^* = \lambda^*(A) u^* \quad \|u\| = 1$$

Accordingly, the minimized cost is $$J^* = \frac{T}{\lambda^*(A)}$$

Proof

By the Rayleigh's theorem $$\lambda_{min}(A) \|u\|^2 \leq u^T A\, u \leq \lambda_{max}(A) \|u\|^2$$

we have, for a given torque T $$\lambda_{min}(A) \|u\|^2 \leq 2T \leq \lambda_{max}(A) \|u\|^2$$

(1). If $T > 0$, then $\lambda_{max} > 0$. Since if $\lambda_{max} \leq 0$, then $A \leq 0$ (negative semidefinite), for $\forall u \in R^m$.

$$T = \tfrac{1}{2} u^T A\, u \leq 0$$

This is contradictory to the assumption $T > 0$. Therefore, $\lambda_{max} > 0$. From the right hand inequality of the Rayleigh's theorem $$2T \leq \lambda_{max}(A) \|u\|^2$$

namely, $$\|u\|^2 \geq \frac{2T}{\lambda_{max}(A)}$$

Therefore, $$\|u^*\|^2 = \frac{2T}{\lambda_{max}(A)}$$

(2). If $T < 0$, then $\lambda_{min} < 0$. Because if $\lambda_{min} \geq 0$, then $A \geq 0$ (positive semidefinite), for $\forall u \in \mathfrak{R}^m$, $$T = \tfrac{1}{2} u^T A\, u \geq 0$$

This conflicts with the assumption $T < 0$. Therefore, $\lambda_{min} 0$. From the left hand inequality of the Rayleigh's theorem $$\lambda_{min}(A) \|u\|^2 \leq 2T$$

that is, $$\|u^*\|^2 \geq \frac{2T}{\lambda_{min}(A)}$$

therefore, $$\|u^*\|^2_{min} = \frac{2}{\lambda_{min}(A)}$$

(3). If $T = 0$, clearly $$u^* = 0$$

$$\|u^*\|^2_{min} = 0$$

In the cases of (1) and (2), u* is chosen as $$u^* = \left(\frac{2T}{\lambda^*}\right)^{\tfrac{1}{2}} u^*$$

where u* is the normalized eigenvector of the eigenvalue problem $$A u^* = \lambda^*(A) u^*$$

$\lambda^*$ is either the $\lambda_{max}$ or the $\lambda_{min}$. It can be proven by premultiplying $(u^*)^T$ $$(u^*)^T A u^* = \lambda^*(A)(u^*)^T u^* = \lambda^*(A) \|u^*\|^2 = 2T$$

or $$\|u^*\|^2 = \frac{2T}{\lambda^*(A)}$$

By applying the theorem we just proved on $$T_I = \tfrac{1}{2} u^T A_I u \quad (I = 1, 2, 3)$$

respectively, we obtain three optimal control vectors $u_1, u_2, u_3$. They are the principle control vectors which minimize the control input energy and satisfy each torque constraint in x, y, and z directions.

Wherefore, the following is claimed:

1. A system for controlling a spherical motor having a spherical stator concentric with a spherical rotor and actuation means for controlling relative movement between the stator and the rotor, comprising:
   a computer system having a digital signal processor for processing digital image data, a communications port for communication with a host computer, a ROM for receiving a program for operating said computer system from said host computer, and a RAM for receiving and running said program;
   an imaging system in communication with said computer system, said imaging system having an image sensor for receiving an image from an illuminated object, an analog-to-digital converter for converting said image to digital image data, and a video buffer for storing said digital image data and for writing said digital image data to said computer system;
   means for selectively causing said imaging system to discard pixel areas of said image which are outside of a pertinent pixel area containing said object, said pixel area defined by selectable rows and selectable columns, and for directly transferring said pertinent pixel area to said digital signal processor;
   means for determining torques to be applied by said stator upon said rotor to achieve a desired rotor trajectory; and
   means for controlling said actuation means to achieve said torques.

2. The system of claim 1, wherein said actuation means comprises a plurality of stator poles on said stator and a plurality of rotor poles on said rotor.

3. The system of claim 1, further comprising:

means for determining stator current values for said pluralities of stator poles in order to achieve said torques;

means for comparing said stator current values with respective maximum current values corresponding with said stator poles;

means for replacing each stator current value with a corresponding maximum current value when said stator current value exceeds said maximum current value; and means for forwarding said stator current values to said plurality of said stator poles.

4. The system of claim 1, further comprising means for minimizing total energy input to said actuation means in order to achieve said desired rotor trajectory.

5. The system of claim 1, further comprising means for controlling said actuation means by computing a control vector from said torques, said control vector having three orthogonal vector components, each of said vector components having a weighting factor coefficient.

6. A system for controlling a variable reluctance spherical motor, comprising:
a spherical stator having a plurality of stator poles;
a spherical rotor surrounded by said stator and having a plurality of rotor poles, said spherical rotor and said spherical stator having a common center;
means for permitting relative movement of said rotor and said stator about said common center;
a grid pattern substantially concentric and movable with said rotor;
an image sensor configured to view said grid pattern;
processing means connected to said image sensor, said processing means for determining a three dimensional orientation of said rotor relative to said stator from an image of said grid pattern; and
control means associated with said processing means, said control means for determining a torque to be applied by said stator upon said rotor to achieve a desired rotor trajectory, said control means for controlling relative movement between said stator and said rotor by selectively energizing said poles in order to achieve said torque.

7. The system of claim 6, wherein said rotor poles are positioned on said rotor at geometric vertices of a first regular polyhedron wherein said stator poles are positioned on said stator at geometric vertices of a second regular polyhedron.

8. The system of claim 6, wherein said stator poles number greater than said rotor poles.

9. The system of claim 6, wherein said stator poles comprise stator coils and further comprising:
means for determining stator current values for said plurality of said stator poles in order to achieve said torque;
means for comparing said stator current values with respective maximum current values corresponding with said stator poles;
means for replacing each stator current value with a corresponding maximum current value when said stator current value exceeds said maximum current value; and
means for forwarding said stator current values to said plurality of said stator poles.

10. The system of claim 6, further comprising a means associated with said control means for minimizing total energy input to said poles in order to achieve said desired rotor trajectory.

11. The system of claim 6, wherein said rotor poles comprise ferromagnetic material and wherein said stator poles comprise stator coils.

12. The system of claim 6, further comprising an elongated shaft mounted to said rotor.

13. The system of claim 6, further comprising an elongated shaft mounted to said stator.

14. The system of claim 6, wherein said rotor poles comprise ferromagnetic material and wherein said stator poles comprise stator coils, each of said stator coils connected to a corresponding current amplifier, each corresponding current amplifier connected to a digital-to-analog converter, each said digital-to-analog converter interfaced with a decoder which is connected to said control means.

15. The system of claim 11, further comprising a means associated with said control means for minimizing total energy input to said stator poles in order to achieve said desired rotor trajectory.

16. A system for controlling a variable reluctance spherical motor, comprising:
a spherical stator having a plurality of stator poles;
a spherical rotor surrounded by said stator and having a plurality of rotor poles, said rotor and said stator capable of relative movement about a common center;
means for determining a three dimensional orientation of said rotor relative to said stator;
means for controlling energization of said poles to achieve a desired rotor trajectory; and
means for minimizing total energy input to said poles in order to achieve said desired rotor trajectory;
wherein said stator poles comprise stator coils, each of said stator coils connected to a corresponding current amplifier, each corresponding current amplifier connected to a digital-to-analog converter, each said digital-to-analog converter interfaced with a decoder which is connected to said controlling means.

17. The system of claim 16, wherein each of said stator poles comprises a stator coil and further comprising:
means for determining stator current values for said plurality of stator poles in order to achieve said torque;
means for comparing said stator current values with respective maximum current values corresponding with said stator poles;
means for replacing each stator current value with a corresponding maximum current value when said stator current value exceeds said maximum current value; and
means for forwarding said stator current values to said plurality of said stator poles.

18. The system of claim 16, wherein said rotor poles are positioned on said rotor at geometric vertices of a first regular polyhedron and wherein said stator poles are positioned on said stator at geometric vertices of a second regular polyhedron.

19. The system of claim 16, further comprising a grid pattern substantially concentric with and movable with said rotor and an image sensor disposed on said stator for viewing said grid pattern and connected to said means for determining, said means for determining for calculating the three dimensional orientation based upon the viewing of said grid pattern.

20. The system of claim 16, further comprising a shaft mounted to said rotor.

21. The system of claim 16, further comprising an elongated shaft mounted to said stator.

22. A method for controlling a variable reluctance spherical rotor having a spherical stator concentric with a spherical rotor, said stator having a plurality of stator poles and said rotor having a plurality of rotor poles, and a control means for controlling relative movement between the stator and the rotor about a common center by selectively energizing said poles, the method comprising the steps of:

determining a torque to be applied by said stator upon said rotor to achieve a desired trajectory;

energizing the poles to achieve said torque; and minimizing total energy input to said poles in order to achieve said desired rotor trajectory;

wherein each of said stator poles comprises a stator coil and further comprising the steps of:

determining stator current values for said plurality of said stator poles in order to achieve said torques;

comparing said stator current values with respect to maximum current values corresponding with said stator poles;

replacing each stator current value with a corresponding maximum current value when said stator current value exceeds maximum current value; and forwarding said stator current values to said plurality of said stator poles.

23. The method of claim 22, wherein each of said stator poles comprises a stator coil and further comprising the step of determining minimal stator current values for said plurality of said stator poles in order to achieve said torque.

24. The method of claim 20, further comprising the step of energizing a plurality of the stator poles in order to move the rotor about an axis of rotation.

* * * * *

UNITED STATES PATENT AND TRADEMARK OFFICE
CERTIFICATE OF CORRECTION

PATENT NO. : 5,402,049
DATED : March 28, 1995
INVENTOR(S) : Kok-Meng Lee et al.

It is certified that error appears in the above-indentified patent and that said Letters Patent is hereby corrected as shown below:

Column 3, line 33, delete "pulls" and replace with --poles--.

Column 3, line 34, delete "pulls" and replace with --poles--.

Column 6, line 2, change "24a" to --24b--.

Column 6, line 4, change "24b" to --24a--.

Column 12, line 61, delete "compute" and replace with --computes--.

Column 12, line 62, delete "for".

Column 12, line 44, delete "time" and replace with --times--.

Column 21, line 39, insert space between "$T_r = \frac{1}{2} U_r A_r U$" and "$(A_r^T = A_r)$".

Column 12, line 62, delete b.

Signed and Sealed this

Fourth Day of July, 1995

Attest:

BRUCE LEHMAN

Attesting Officer

Commissioner of Patents and Trademarks